(12) United States Patent
Good

(10) Patent No.: US 11,670,049 B1
(45) Date of Patent: Jun. 6, 2023

(54) SYSTEMS AND METHODS FOR EDITING THREE-DIMENSIONAL DATA AND POINT CLOUDS

(71) Applicant: Illuscio, Inc., Culver City, CA (US)

(72) Inventor: Max Good, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/047,387

(22) Filed: Oct. 18, 2022

Related U.S. Application Data

(63) Continuation of application No. 17/743,582, filed on May 13, 2022, now Pat. No. 11,488,360.

(51) Int. Cl.
*G06T 19/00* (2011.01)

(52) U.S. Cl.
CPC .......... *G06T 19/00* (2013.01); *G06T 2200/24* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 11,223,771 B2 * | 1/2022 | Manzari | H04N 23/675 |
| 2005/0223337 A1 | 10/2005 | Wheeler et al. | |
| 2014/0115541 A1 | 4/2014 | Mandel et al. | |
| 2015/0278180 A1 | 10/2015 | Nicholas, Jr. et al. | |
| 2018/0350044 A1 * | 12/2018 | Ponto | G06T 15/00 |
| 2019/0087979 A1 | 3/2019 | Mammou et al. | |
| 2020/0209009 A1 * | 7/2020 | Zhang | G01C 21/3841 |
| 2022/0155948 A1 * | 5/2022 | Chaudhari | G06F 3/0482 |

OTHER PUBLICATIONS

Alam, Nashid, Predrag R. Bakic, and Reyer Zwiggelaar. "Three-dimensional modeling of microcalcification clusters using breast tomosynthesis: a preliminary study." 15th International Workshop on Breast Imaging. vol. 11513. International Society for Optics and Photonics, 2020 (Year: 2020), 9 pages.
Rau et al., "Analysis of Oblique Aerial Images for Land Cover and Point Cloud Classification in an Urban Environment", IEEE Transactions on Geoscience and Remote Sensing, Mar. 2015 (Year: 2015), 17 pages.
Sitek et al., "Tomographic Reconstructions Using an Adaptive Tetrahedral Mesh Defined by a Point Cloud", IEEE Transactions on Medical Imaging, Sep. 2006 (Year: 2006), 8 pages.

* cited by examiner

*Primary Examiner* — Saptarshi Mazumder
(74) *Attorney, Agent, or Firm* — Ansari Katiraei LLP; Arman Katiraei; Sadiq Ansari

(57) ABSTRACT

Disclosed are editing tools for manipulating a three-dimensional ("3D") data file or point cloud. An editing application may generate a visualization of the 3D data file or point cloud, and a user may invoke an editing tool over a particular region of the visualization that is rendered based on the positional and non-positional values of a first data point set and a second data point set from the 3D data file or point cloud. The editing tool may differentiate the first data point set from the second data point set based on unique commonality in the positional and/or non-positional values of the first data point set, and may edit less than all of the particular region by adjusting one or more of the positional and/or non-positional values of the first data point set while retaining the positional and non-positional values of the second data point set.

20 Claims, 16 Drawing Sheets

SYSTEMS AND METHODS FOR EDITING THREE-DIMENSIONAL DATA AND POINT CLOUDS

CLAIM OF BENEFIT TO RELATED APPLICATIONS

This application is a continuation of U.S. nonprovisional application Ser. No. 17/743,582 entitled "Systems and Methods for Editing Three-Dimensional Data and Point Clouds", filed May 13, 2022. The contents of application Ser. No. 17/743,582 are hereby incorporated by reference.

BACKGROUND

A variety of tools exist for editing two-dimensional ("2D") images. These tools may be used to adjust the visual characteristics of 2D pixels in one region, copy visual information from pixels in one region to another region, transform pixels, and/or perform other edits. However, these 2D image editing tools do not account for the z-coordinate positional element that is present in three-dimensional ("3D") data, and may consequently produce undesirable effects or changes when the 3D data is edited across only two of the three dimensions.

DETAILED DESCRIPTION OF PREFERRED EMBODIMENTS

The following detailed description refers to the accompanying drawings. The same reference numbers in different drawings may identify the same or similar elements.

Provided are systems and methods for editing three-dimensional ("3D") data or 3D representation of spatial data that may be stored within a point cloud or other 3D file formats. The systems and methods may include a set of 3D editing tools that use the x, y, and z coordinate positioning values and/or other non-positional values of the 3D data or point cloud data points to implement different edits that manipulate the data points based on their relative 3D positioning and/or non-positional value commonality. Consequently, 3D data or point cloud data points that fall within an edited region do not necessarily receive the same edits. In this manner, the set of 3D editing tools may provide more refined control and manipulation over data points positioned in 3D space than existing 2D editing tools, and may produce dynamic effects that are not possible with existing editing tools that do not account for the z-coordinate positioning or 3D positioning of the data points being edited.

Figure 1:
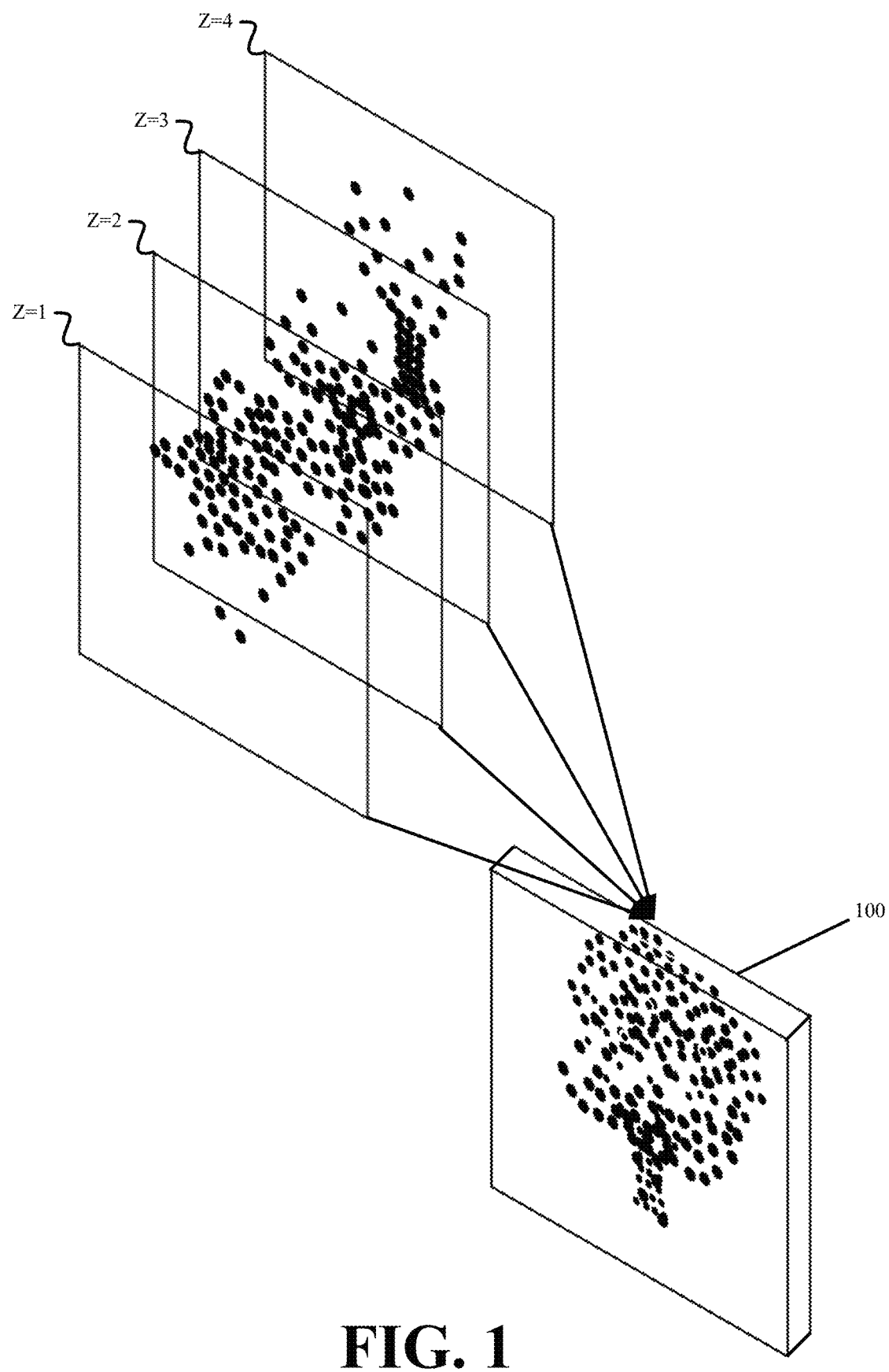
FIG. 1 illustrates an example point cloud that represents a three-dimensional ("3D") object or 3D environment using data points with different characteristics at different 3D positions.

A 3D data format or point cloud may include a set of data points for representing a volumetric object, environment, or article in 3D space. FIG. 1 illustrates an example point cloud 100 that represents a 3D object or 3D environment using data points with different characteristics at different 3D positions. The point cloud data points therefore represent one example of 3D data that may be edited using the 3D editing tools described below.

The point cloud data points may differ from pixels of a two-dimensional ("2D") image, because certain regions of point cloud 100 may have no data points, lower densities of data points, and/or higher densities of data points based on varying amounts of visual information that is detected or scanned at those regions. In contrast, pixels of a 2D image have a uniform density and fixed arrangement that is defined by the resolution of the 2D image. In other words, the point cloud data points may have a non-uniform placement or positioning, whereas the 2D image has pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of an imaged surface, feature, or article of the 3D object or the 3D environment in 3D space.

The non-positional elements may include information about the detected characteristics of the surface, feature, or article imaged at a corresponding position in 3D space. The characteristics may correspond to a detected color. The color may be represented using red, green, blue ("RGB"), and/or other values. In some embodiments, the characteristics may provide the chrominance, hardness, translucence, reflectivity, luminance, metallic characteristics, roughness, specular, diffuse, albedo, index of refraction ("IOR"), point or surface normal, and/or other properties of the imaged surface, feature, or article.

In some embodiments, the characteristics may be related to properties of the device used to generate each of data points. For instance, the characteristics may include a Tesla strength value to quantify the strength of the magnetic field that was used in detecting and/or imaging the surface, feature, or article represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, point or surface normal, tesla, and/or other values.

Point cloud 100 and the individual data points of point cloud 100 may be generated by a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each data point in 3D space, and a second imaging device (e.g., a high-resolution camera) may measure or capture the characteristics or other non-positional information for each data point. One or more photogrammetry techniques may be used to consolidate the data from the first imaging device and the second imaging device, and to create the point cloud 100.

In some embodiments, point cloud 100 and the individual data points of point cloud 100 may be generated from other image formats or 3D environments. For instance, a 3D environment that is originally constructed via polygons and meshes may be redefined to replace each polygon or mesh with a set of data points that are distributed over the 3D space or region represented the replaced polygon or mesh. Other imaging techniques, such as a structure from motion process, may be used to generate point cloud 100 and its data points.

The systems and methods may provide a set of 3D editing tools that leverage the positional elements of the data points to dynamically and intelligently manipulate the data points in ways that are not possible without the 3D positional coordinates and/or when applying edits over two dimensions or the x and y planes. For instance, pixels of a 2D image may produce a visualization of a tree in a foreground and a blue sky in a background. A 2D paint brush may be used to adjust the color of the tree. However, if the 2D paint brush touches any of the pixels of the blue sky, the 2D paint brush will modify the color values of those pixels thereby creating visual discontinuity in the image and an desirable effect.

The set of 3D editing tools may include a 3D brush tool that leverages the 3D positional data to selectively manipulate data points at certain depths, in certain volumes, and/or in certain regions of 3D space. Specifically, the 3D brush tool may selectively edit one or more non-positional elements of a first set of data points with a first range of z-coordinate positional values in a given region defined along x and y planes without affecting a second set of data points in the given region with a different second range of z-coordinate positional values.

Figure 2:
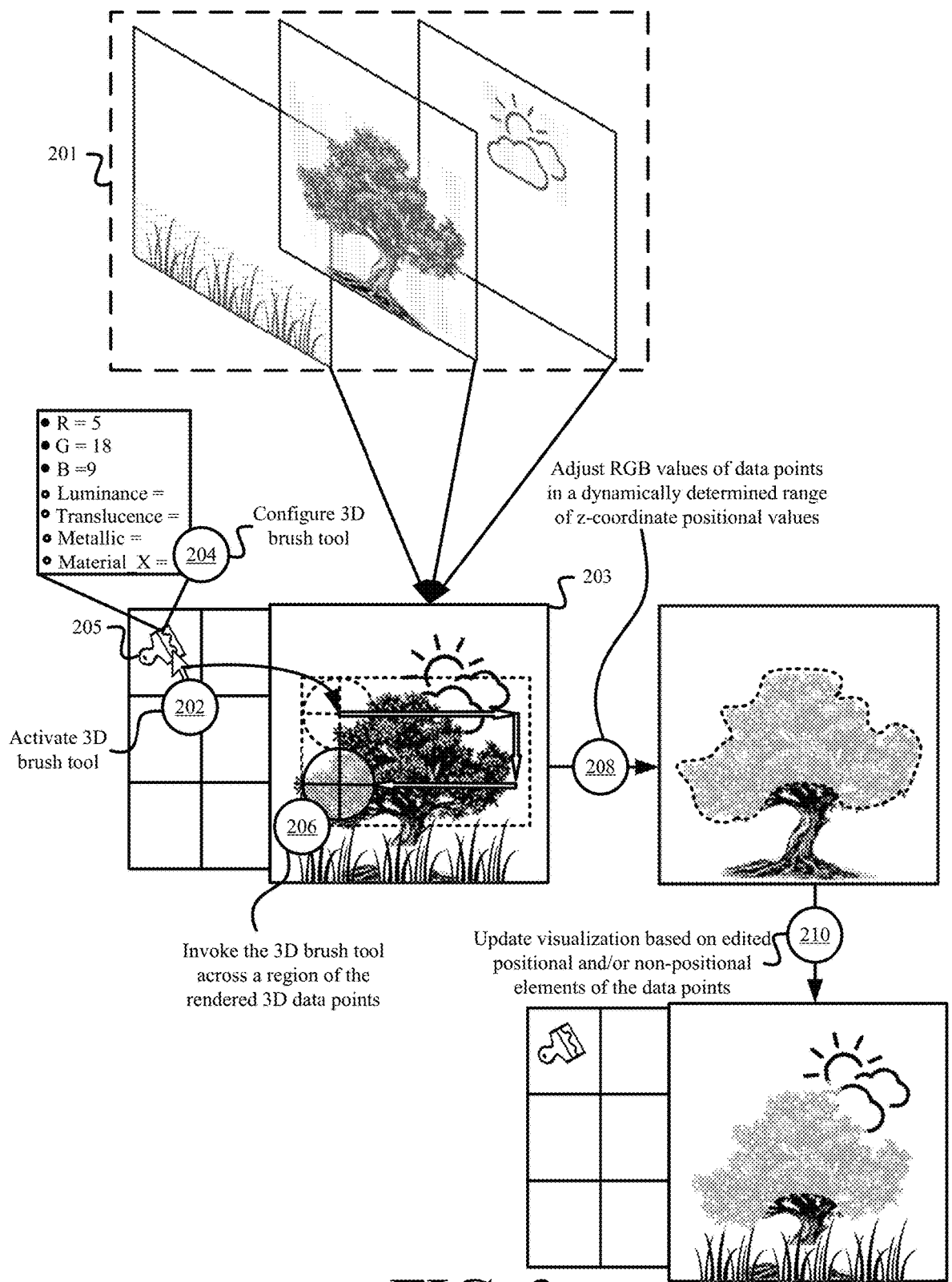
FIG. 2 illustrates example operation of a 3D brush tool in accordance with some embodiments presented herein.

FIG. 2 illustrates example operation of the 3D brush tool in accordance with some embodiments presented herein. As shown in FIG. 2, 3D data file 201 or point cloud may be loaded into 3D editing application 203, and a visualization or rendering of 3D data file 201 or point cloud may be presented within editing application 203 on a display.

3D editing application 203 may include a graphical user interface ("GUI") with interactive GUI elements for selecting between the different 3D editing tools. The user may select the GUI element for 3D brush tool 205 to activate (at 202) 3D brush tool 205.

Once activated (at 202), the cursor may be used to control the application of 3D brush tool 205 on 3D data of 3D data file 201 or data points of the point cloud. In some embodiments, 3D brush tool 205 may be used to adjust or change one or more non-positional elements of data points having z-coordinate positional values that are within a dynamically determined range of z-coordinate positions or that have a certain frustum depth or range of frustum depths (e.g., depth from the render position). In some embodiments, 3D brush tool 205 may be used to adjust or change one or more non-positional elements of data points that are within a user selected volume or custom-defined region within 3D space.

The user may configure (at 204) 3D brush tool 205 with values for the non-positional elements of the data points that are to be edited. For instance, 3D brush tool 205 may be configured (at 204) to adjust one or more RGB and/or other color values of the data points, or may be configured (at 204) to adjust one or more of the chrominance, hardness, translucence, reflectivity, luminance, metallic characteristics, roughness, specular, diffuse, albedo, IOR, point or surface normal, and/or other property defined as a non-positional element of the data points. In this example, the user sets (at 204) 3D brush tool 205 to a particular RGB value.

The user may invoke (at 206) 3D brush tool 205 over a region of the rendered 3D data file 201 or point cloud. For instance, the user may press a button or provide other input while moving the cursor over the region.

Rather than change the RGB values of any data point with x and y positions within the region, 3D brush tool 205 may evaluate the values for the x, y, and z positional elements of the data points within the region, may determine the one or more most common z-coordinate positional values or frustum depths of the data points within the region that are frontmost or visible, and may dynamically apply (at 208) the edit to the subset of data points within the region that have the one or more most common z-coordinate positional values, frustum depths, and/or that are within a threshold number of planes from the most common z-coordinate positional values or frustum depths. For instance, if the most common z-coordinate positional value is 10, 3D brush tool 205 may apply (at 208) the edit to a first data point set (e.g., a first set of data points) that have x and y coordinate positional values within the region and that have a z-coordinate positional value that is between 7-13, and may not apply the edit to a second data point set (e.g., a second set of data points) that have x and y coordinate positional values within the region and that have a z-coordinate positional value that is less than 7 or greater than 13.

As shown in FIG. 2, 3D brush tool 205 may determine that the data points for the leaves of the tree have the most common z-coordinate positional values or frustum depths in the region that are frontmost or visible, and may adjust (at 208) the RGB non-positional elements of those data points to the particular RGB values set for 3D brush tool 205 without adjusting the RGB non-positional elements for data points representing the tree trunk or branches, clouds, and sun in the background having z-coordinate positional values that differ from the most common z-coordinate positional values by more than a threshold amount, or the RGB non-positional elements for data points representing the grass in the foreground having z-coordinate positional values that differ from the most common z-coordinate positional values by more than the threshold amount. The adjusted non-positional values for the edited set of data points may be stored in 3D data file 201 or point cloud, and application 203 may render (at 210) or update the visualization based on the positional and non-positional elements of the edited 3D data file 201 or point cloud.

In some embodiments, 3D brush tool 205 may have a setting to inverse the application of the edit from the in-focus or dynamically selected data points (e.g., the data points with z-coordinate values within the threshold number of planes from the most common z-coordinate positional values) to the out-of-focus or dynamically unselected data points (e.g., the data points with z-coordinate values not within the threshold number of planes from the most common z-coordinate positional values). The setting may be modified via a GUI toggle switch associated with 3D brush tool 205. In the example of FIG. 2, inversing the application of the edit may include retaining the original RGB values for the data points representing the leaves, and adjusting or editing the RGB values for the data points represented the branches or tree trunk based on the particular RGB values configured for 3D brush tool 205 that are within the region where 3D brush tool 205 was invoked.

In some embodiments, a user may select a volume or region prior to invoking (at 206) 3D brush tool 205 or may select the volume or region while invoking (at 206) 3D brush tool 205. In some such embodiments, 3D brush tool 205 may adjust (at 208) the RGB non-positional elements of the data points that are within the selected volume or region. For instance, and with reference to FIG. 2, the user may select a region of 3D space that includes the tree leaves but excludes the clouds and sun behind the selected leaves. The user may move the cursor within the rendered 3D visualization and may rotate within the visualized environment to select the desired volume or region. Alternatively, 3D brush tool 205 may provide editable 3D forms, such as spheres, cylinders, cones, etc., to specify the selection. 3D brush tool 205 may then adjust (at !208) the RGB non-positional elements of the 3D data within the selected volume or region.

Figure 3:
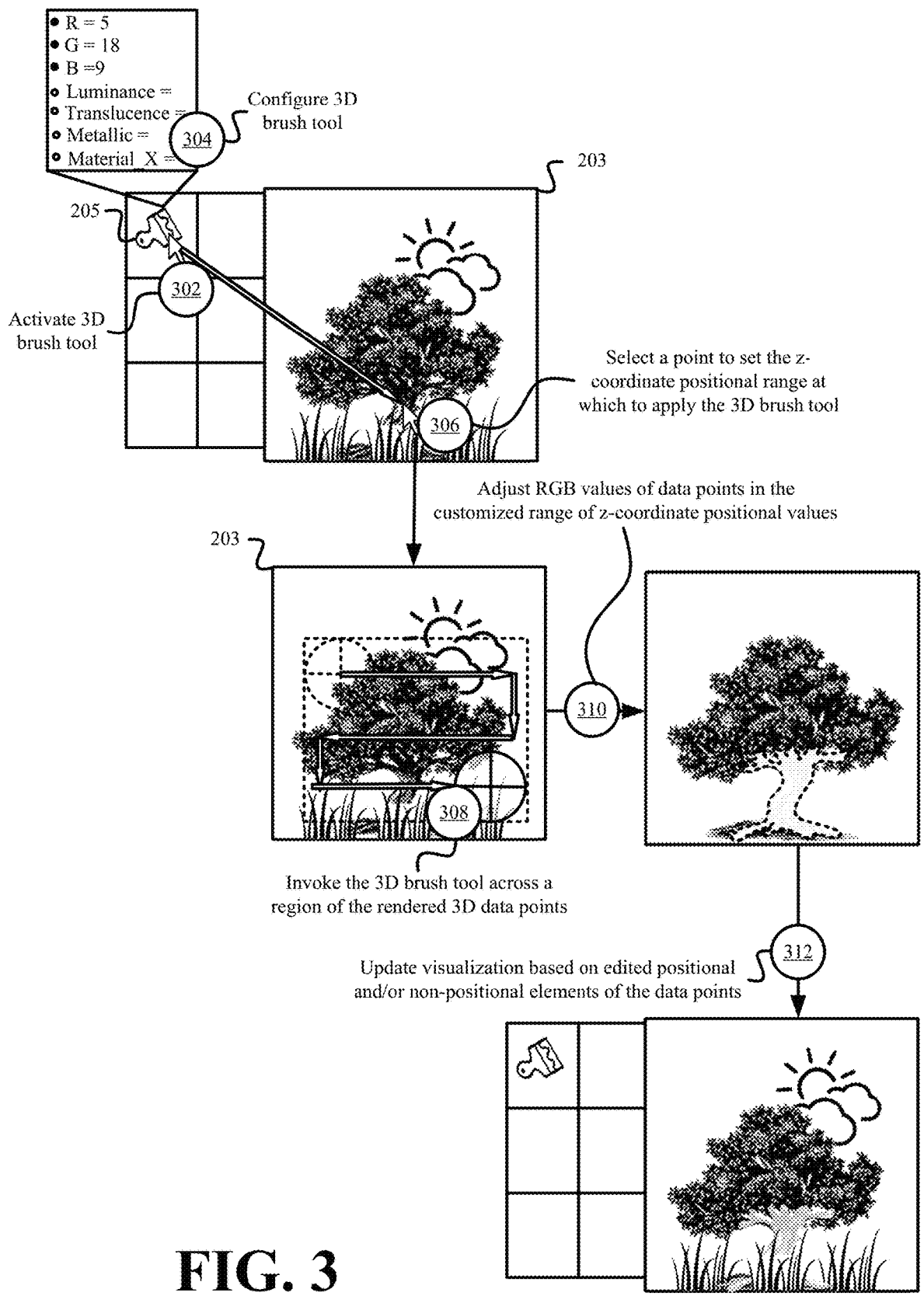
FIG. 3 illustrates an example of customizing the application of the 3D brush tool to user-defined z-coordinate positional values in accordance with some embodiments presented herein.

In some embodiments, 3D brush tool 205 may have a setting with which the user may customize the z-coordinate positional values of the data points that are to receive the edit. FIG. 3 illustrates an example of customizing the application of 3D brush tool 205 to user-defined z-coordinate positional values in accordance with some embodiments presented herein.

As shown in FIG. 3, the user may select (at 302) 3D brush tool 205, configure (at 304) 3D brush tool 205 with values for one or more non-positional elements that are subject to the edit (e.g., RGB elements, reflectivity, translucency, luminance, chrominance, etc.), and may move the cursor to select (at 306) a point within the rendered 3D data file 201 or point cloud. 3D brush tool 205 may obtain the z-coordinate positional value or frustum depth for the data point that is rendered at the selected point, and may center a range of z-coordinate values or frustum depths that are subject to the edit based on the z-coordinate positional value or frustum depth for the data point corresponding to the user selected point. The user may adjust the range manually. For instance, the z-coordinate positional value for the data point corresponding to the selected point may have a value of 10, and 3D brush tool 205 may define a range of z-coordinate positional values between 7-13 at which 3D brush tool 205 applies. In other words, 3D brush tool 205 may dynamically configure based on the selected point to adjust the selected non-positional elements of data points having z-coordinate positional values between 7-13, and the user may manually increase or decrease the range of z-coordinate positional value to customize the application of 3D brush tool 205.

The user may invoke (at 308) 3D brush tool 205 over a region of the rendered data points from 3D data file 201 or point cloud, and 3D brush tool 205 may dynamically apply (at 310) the edit to the subset of data points within the region that have a z-coordinate positional value or frustum depth within the range of z-coordinate values or frustum depths, and may not apply the edit to other data points within the region that have a z-coordinate positional value or frustum depth outside the range of z-coordinate values or frustum depths. As shown in FIG. 3, 3D brush tool 205 may dynamically set the range of the z-coordinate positional values for editable data points to match or to be in range of the selected tree trunk data point, and may dynamically adjust (at 310) the selected non-positional elements of the data points corresponding to the tree trunk and tree branches in the region where the 3D brush tool 205 is invoked and that have z-coordinate positional elements within the dynamically set range of z-coordinate positional values, and may retain, without adjusting, the non-positional values of the data points corresponding to the tree leaves, clouds, sun, and grass also in the region where the 3D brush tool 205 is invoked but that have z-coordinate positional elements outside or that differ from the dynamically set range of z-coordinate positional values. Application 203 may render (at 312) or update the visualization based on the positional and non-positional elements of the edited 3D data file 201 or point cloud.

Figure 4:
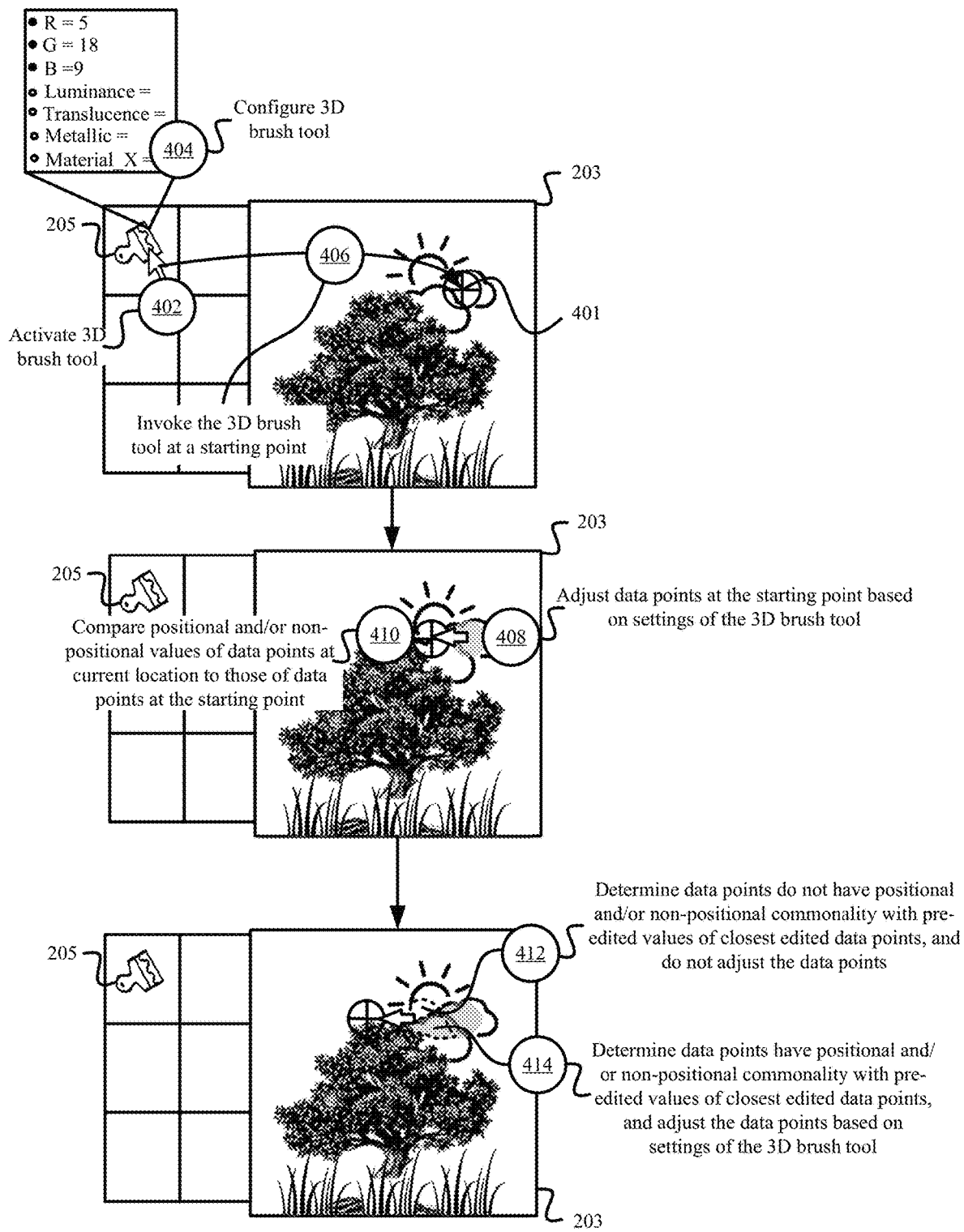
FIG. 4 illustrates an example of dynamically applying the 3D brush tool using artificial intelligence and/or machine learning ("AI/ML") techniques in accordance with some embodiments presented herein.

In some embodiments, 3D brush tool 205 may use artificial intelligence and/or machine learning ("AI/ML") techniques to dynamically determine and refine the application of the 3D brush tool edits to a subset of data points. FIG. 4 illustrates an example of dynamically applying 3D brush tool 205 using AI/ML techniques in accordance with some embodiments presented herein.

The user may select (at 402) and configure (at 404) 3D brush tool 205 to replace or adjust one or more non-positional elements. The user may invoke (at 406) 3D brush tool 205 at starting point 401 within the rendered 3D data file 201 or point cloud. 3D brush tool 205 may determine the z-coordinate positional value of the one or more data points at the particular starting point where 3D brush tool 205 is first invoked (at 406), and may adjust (at 408) one or more non-positional values of the one or more data points according to the settings and/or configuration of 3D brush tool 205.

The user may continue the invocation by moving 3D brush tool 205 away from starting point 401. As 3D brush tool 205 moves off starting point 401 and over a next set of data points, 3D brush tool 205 may use AI/ML techniques to compare (at 410) the positional values and/or non-positional values of the next set of data points to the corresponding positional values and/or non-positional values of the one or more data points at starting point 401 to determine if the data points are connected.

In some embodiments, a connected data point may include a particular data point at the current cursor location that have specified positional and/or non-positional commonality with one or more data points that have received the 3D brush tool edit and that are closest to the particular data point. The AI/ML techniques may determine positional commonality based on one or more of the x, y, and/or z coordinate positional values of the particular data point differing by less than a threshold amount from the corresponding positional values of the one or more data points that have received the 3D brush tool edit and that are closest to the particular data point. The AI/ML techniques may determine non-positional commonality based on one or more of the color values (e.g., RGB values), chrominance, luminance, reflectivity, translucence, and/or other material properties of the particular data point differing by less than a threshold amount from the corresponding original non-positional values (e.g., values before adjustment by 3D brush tool 205) of the one or more data points that have received the 3D brush tool edit and that are closest to the particular data point.

As shown in FIG. 4, 3D brush tool 205 may determine (at 412) that a first set data points at the current cursor location representing part of the sun does not have positional and/or non-positional commonality with the pre-adjusted positional and/or non-positional values of the closest edited data points (e.g., data points at starting point 401). Specifically, the coloring of the first set of data points (e.g., a first data point set) for the sun may differ by a threshold amount from the coloring of the data points for the cloud at starting point 401. Accordingly, 3D brush tool 205 may not be applied (at 412) to the first set of data points, and may not adjust the non-positional values of the first set of data points.

3D brush tool 205 may determine (at 414) that a second set of data points (e.g., a second data point set) at the current cursor location representing part of the neighboring cloud does have positional and/or non-positional commonality with the pre-adjusted positional and/or non-positional values of the closest edited data points (e.g., data points at starting point 401). Specifically, the coloring and/or z-coordinate positional values of the second set of data points for the neighboring cloud may be within a threshold amount if the coloring and/or z-coordinate positional values of the data points for the cloud at starting point 401. Accordingly, 3D brush tool 205 may adjust (at 414) the non-positional values of the second set of data points based on the configured non-positional values of 3D brush tool 205.

As 3D brush tool 205 moves further away from starting point 401, 3D brush tool 205 may dynamically adjust the positional and/or non-positional values used in determining if data points at the current 3D brush tool 205 location are connected and/or have positional and/or non-positional commonality for receiving the 3D brush tool edits. For instance, as 3D brush tool 205 is moved over the tree, 3D brush tool 205 may compare the positional and/or non-positional values of a third set of data points represented the tree leaves at the current position of 3D brush tool 205 against the pre-adjusted or pre-edited positional and/or non-positional values of the second set of data points that are closest to the third set of data points and that received the edits of 3D brush tool 205. In other words, 3D brush tool 205 may determine if there is the positional and/or non-positional commonality between the third set of data points and the second set of data points and not between the third set of data points and the set of data points at starting point 401 in order to determine whether to adjust the non-positional values of the third set of data points based on the configured settings of 3D brush tool 205.

Figure 5:
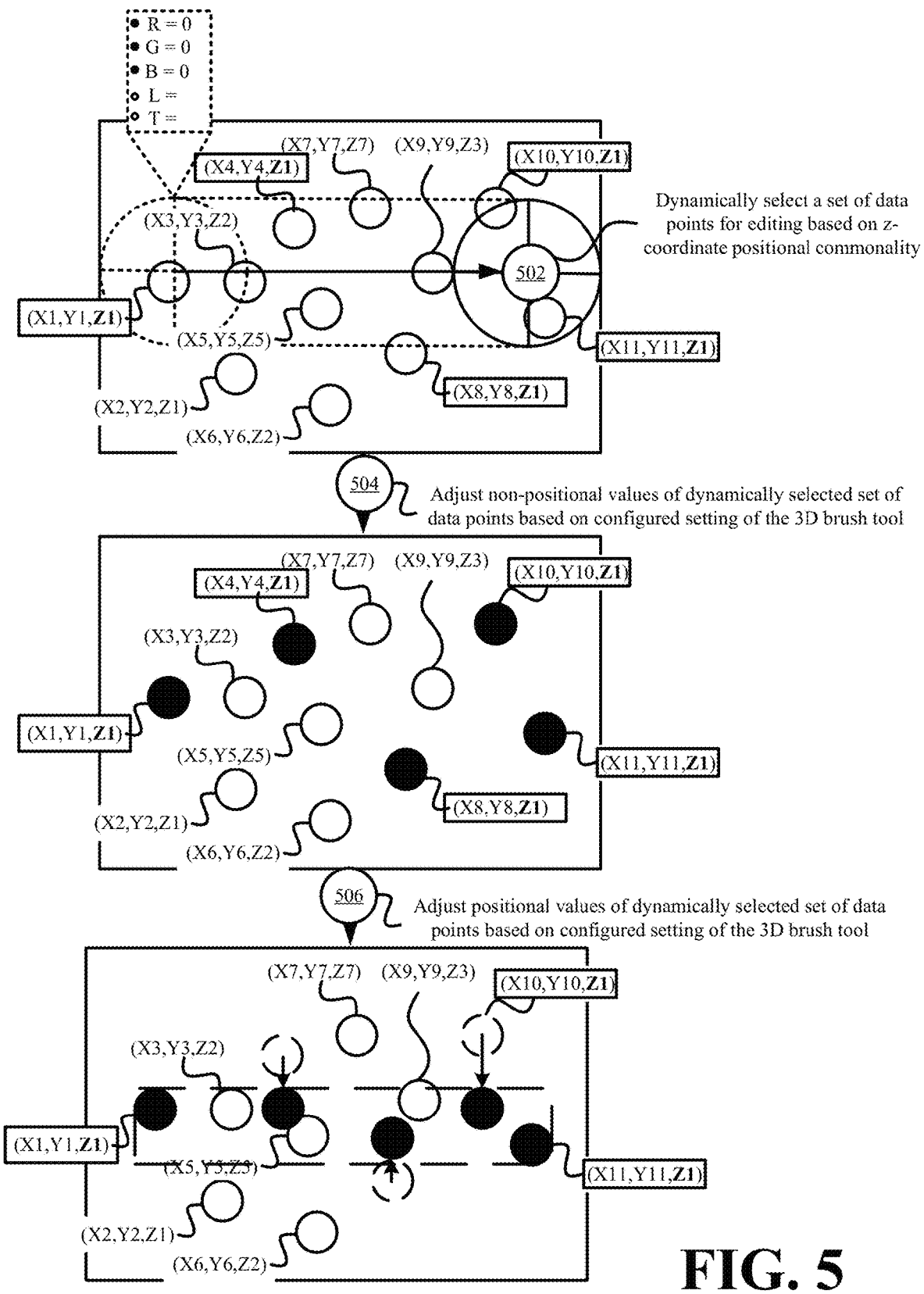
FIG. 5 illustrates an example of adjusting and aligning data points using the 3D brush tool in accordance with some embodiments presented herein.

In some embodiments, 3D brush tool 205 may reposition data points in addition to editing the non-positional elements of the data points. FIG. 5 illustrates an example of adjusting and aligning data points using 3D brush tool 205 in accordance with some embodiments presented herein.

As shown in FIG. 5, 3D brush tool 205 may move across a region that includes several data points. 3D brush tool 205 may dynamically select (at 502) a set of data points within the region for editing based on z-coordinate positional commonality and/or other detected positional and/or non-positional commonality amongst the set of data points.

3D brush tool 205 may modify (at 504) or replace one or more non-positional values of the set of data points based on the settings and/or configuration of 3D brush tool 205. Additionally, 3D brush tool 205 may modify (at 506) the positional elements of the set of data points so that the set of data points are aligned to form a plane with uniform values for the one or more edited non-positional elements. In some embodiments, 3D brush tool 205 may delete or remove any data points within the plane that did not have the z-coordinate positional commonality and were not edited.

In some embodiments, 3D brush tool 205 may modify (at 506) the positional elements of the set of data points based on the positional elements of the neighboring data points within the set of data points having the z-coordinate positional commonality. For instance, 3D brush tool 205 may adjust x and/or y coordinate positions of a data point that it is within the range of x and/or y coordinate positions of surrounding data points. In some other embodiments, 3D brush tool 205 may determine the positional values for a first subset of the set of data points at the edges, may adjust the positional values of a second subset of the set of data points to align along a flat, curved, and/or other plane that extends to the edges defined by the first subset of data points.

The set of 3D editing tools may include a 3D cloning tool that leverages the 3D positional data to copy non-positional values from a first set of data points in a first region to a dynamically selected second set of data points in a second region. In some embodiments, the 3D cloning tool may dynamically clone the non-positional values of data points at different depths in the first region to the non-positional values of data points at corresponding depths in the second region. Consequently, the 3D cloning tool provides the ability to clone the non-positional elements on specific objects at certain depths in the second region without blending or losing the visual distinction between those specific objects and other neighboring or overlapping objects at different depths in the second region. In some embodiments, the 3D cloning tool may add data points in the second region where there are no or missing data points in the second region at equal depths to the data points in the first region. In some embodiments, the 3D cloning tool may adjust the z-coordinate element and/or other positional elements of the data points in the second region that are not aligned with the z-coordinate element and/or other positional elements of the data points from the first cloned region.

Figure 6:
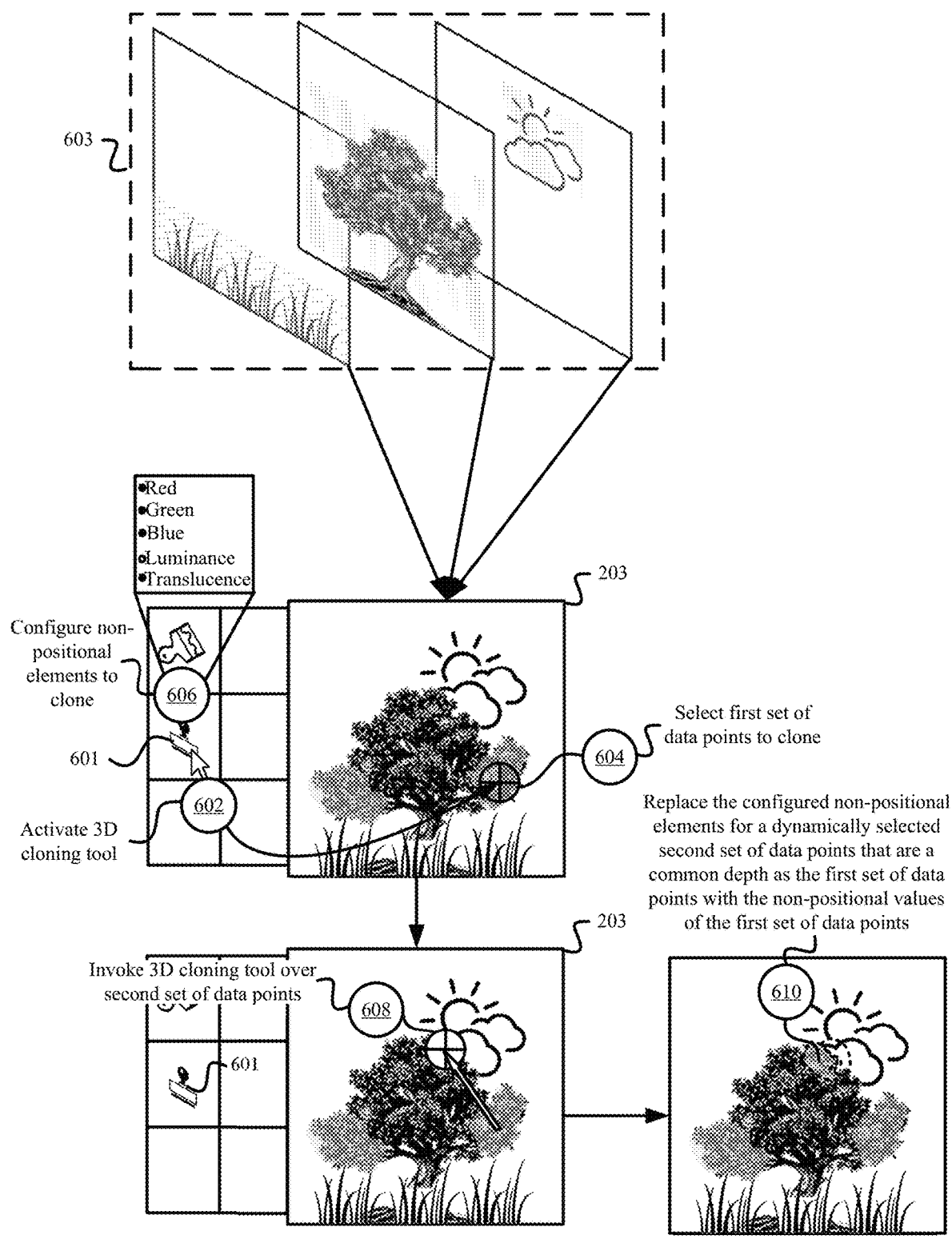
FIG. 6 illustrates example operation of the 3D cloning tool in accordance with some embodiments presented herein.

FIG. 6 illustrates example operation of the 3D cloning tool in accordance with some embodiments presented herein. The user may select the GUI element for 3D cloning tool 601 to activate (at 602) the 3D cloning tool functionality. Once activated (at 602), the cursor may be used to control application of 3D cloning tool 601 on the data points of 3D data file 603 or point cloud within 3D editing application 203.

3D cloning tool 601 may be used to select (at 604) a first set of data points within a first region of the rendered 3D data file 603 or point cloud. In some embodiments, the selection (at 604) may include all data points within the first region regardless of the different z-coordinate positions of the data points. In some embodiments, the selection (at 604) may include a subset of all data points in the first region that have certain z-coordinate positional values (e.g., range of values centered on the most common z-coordinate positional values in the first region) and/or z-coordinate positional commonality.

3D cloning tool 601 may also be used to configure (at 606) which non-positional elements of the selected first set of data points to clone. For instance, the user may configure (at 606) 3D cloning tool 601 to clone a first subset of the non-positional elements (e.g., the red color value and the luminance) of the first set of data points during a first invocation of 3D cloning tool 601, and may configure (at 606) 3D cloning tool 601 to clone a different second subset of the non-positional elements (e.g., the green color value, the blue color value, the translucency, and the reflectivity) of the first set of data points during a second invocation of 3D cloning tool 601.

The user may move 3D cloning tool 601 to a second region of the rendered 3D data file 603 or point cloud, and may invoke (at 608) 3D cloning tool 601 to replace (at 610) the configured (at 606) non-positional elements of a dynamically selected second set of data points in the second region with the values from the configured non-positional elements of the first set of data points. Dynamically selecting the second set of data points may include determining a distance of each data point in the first set of data points from one or more boundaries of the first region or a view frustum. The distance may be computed based on the x, y, and z coordinate positional values of each data point. Dynamically selecting the second set of data points may further include detecting a first data point that is a particular distance from a particular boundary of the second region or the view frustum, and a corresponding second data point that is the particular distance from the particular boundary of the first region or the view frustum. 3D cloning tool 601 may replace (at 610) the configured non-positional elements of the first data point with the values from the configured non-positional elements of the second data point. In other words, 3D cloning tool 601 does not replace the configured non-positional elements of any and all data points where 3D cloning tool 601 is invoked (at 608). Instead, 3D cloning tool 601 may replace and/or clone (at 610) the configured non-positional elements from a data point in the first region on a data point in the second region that is at the same or similar depth and that is at the same or similar distance within the second region as the data point in the first region. If a data point in the second region is not aligned with any data point in the first region based on the relative positions of the data points in their respective regions or a distance to the view frustum, 3D cloning tool 601 may nevertheless find a closest matching data point in the first region and replace (at 610) the configured non-positional elements of the data point in the second region with the values from the corresponding configured non-positional elements of the closest matching data in the first region, or 3D cloning tool 601 may add one or more new data points in the second region for the unmatched data points in the first region that are to be cloned.

As shown in FIG. 6, 3D cloning tool 601 may be invoked (at 608) over a first subset of data points for the clouds and sky in the background and over a second subset of data points for leaves at the top of the tree. 3D cloning tool 601 may determine that the first subset of data points do not have z-coordinate positional commonality with the first set of data points, and therefore does not apply the edit to the first subset of data points. The values for the configured non-positional elements of the first subset of data points are left unchanged. 3D cloning tool 601 may determine that the second subset of data points do have z-coordinate positional commonality with the first set of data points, and therefore clones the values from the configured non-positional elements of the first set of data points that are positionally or relatively aligned with the second subset of data points to the values of the configured non-positional elements of the second set of data points.

In some embodiments, 3D cloning tool 601 may use AI/ML techniques to dynamically select the second set of data points whose non-positional values are to be replaced with the non-positional values of the first set of data points in the region that is to be cloned elsewhere. Specifically, the AI/ML techniques may analyze positional and non-positional values of the first set of data points in the region that is to be cloned elsewhere, and may replace the configured non-positional elements of a second set of data points in another region where 3D cloning tool 601 is invoked in response to the second set of data points having additional positional and/or non-positional commonality with the first set of data points besides z-coordinate positional commonality. For instance, 3D cloning tool 601 may clone the non-positional values from the data points representing the tree leaves onto a different set of data points that represent tree leaves elsewhere in the point cloud based on positional commonality and also color commonality between the sets of data points. Accordingly, 3D cloning tool 601 would not replace the non-positional elements of data points that represent branches or wood even though the data points may have positional commonality since the data points have different color values that do not satisfy the non-positional commonality specified for 3D cloning tool 601.

In some embodiments, 3D cloning tool 601 may create artificial data points in the second region if there are no data points or fewer data points in the second region to receive the values of the configured non-positional elements from data points in the first region that are selected for cloning elsewhere (e.g., in the second region). In some such embodiments, 3D cloning tool 601 may be used to add detail to the 3D data file or point cloud when the 3D data file or point cloud was not properly scanned or was incompletely scanned.

Figure 7:
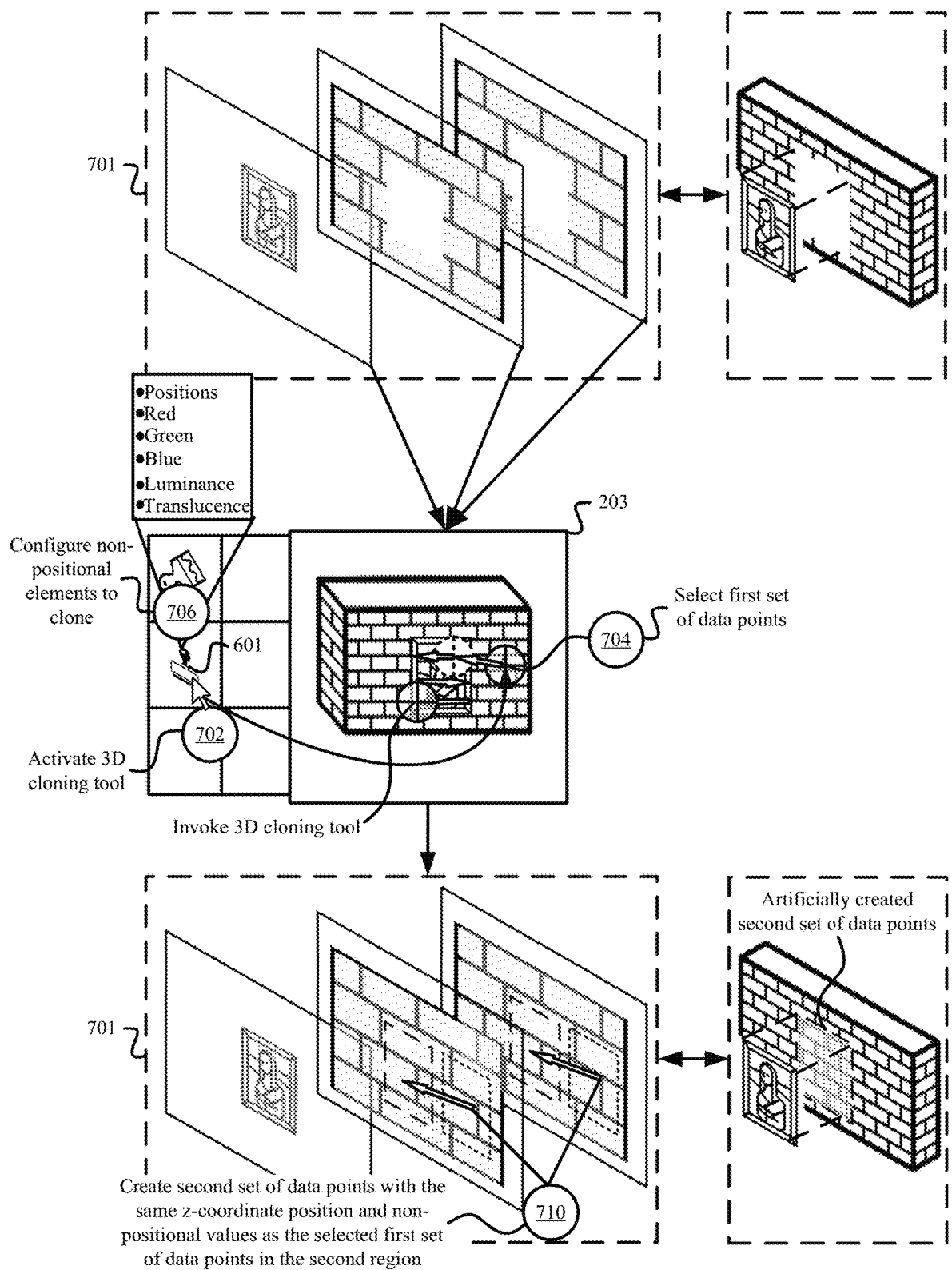
FIG. 7 illustrates an example of artificially creating data points in a point cloud using a 3D cloning tool in accordance with some embodiments presented herein.

FIG. 7 illustrates an example of artificially creating data points in a point cloud using 3D cloning tool 601 in accordance with some embodiments presented herein. FIG. 7 illustrates a visualization that is created from the data points of point cloud 701. The visualization may include a textured brick wall and a painting in front of a particular region of the textured brick wall. If the 3D data or point cloud 701 is rotated to the side or behind the textured brick wall, there are no data points representing the textured brick wall behind the painting. Accordingly, point cloud 701 may be an incomplete capture of the 3D environment.

The user may use 3D cloning tool 601 to fill in the missing part of the textured brick wall at the correct position behind the painting. To do so, the user may activate (at 702) 3D cloning tool 601 and select (at 704) a first region of the textured brick wall that is not obscured by the painting. 3D cloning tool 601 may obtain the values for the positional and non-positional elements of the first set of data points within the first region, and may be configured (at 706) to clone all the obtained values when 3D cloning tool 601 is invoked in a second region.

The user may move the cursor to a second region corresponding to where the painting is presented, and may invoke (at 708) 3D cloning tool 601 to copy and/or clone the first set of data points within the second region. Specifically, 3D cloning tool 601 may create (at 710) a second set of data points with the same z-coordinate positional values as the first set of data points in the second region.

3D cloning tool 601 may determine that the depth or z-coordinate positional values of the data points representing the painting do not match or conflict with the depth or z-coordinate values of the first set of data points representing the portion of the textured brick wall that is to be cloned. Accordingly, since the first set of data points are in a farther plane than the data points representing the painting, the second set of data points may be created (at 710) behind the data points representing the painting. In other words, the second set of data points may have the same x and y coordinate positional values as the data points representing the painting. However, the z-coordinate positional value of the second set of data points will be greater than the z-coordinate positional value of the data points representing the painting, and may therefore be added into point cloud 701 without modifying the data points representing the painting. Creating (at 710) the second set of data points may also include copying the selected non-positional values of the first set of data points to corresponding non-positional values of the second set of data points. Consequently, 3D cloning tool 601 may artificially create data points that extend the textured brick wall behind the data points representing the painting so that if point cloud 701 is rotated, there will not be empty space behind the painting and the backside of the painting will be obscured by the artificially created textured brick wall. In some embodiments, if data points exist in the second region at the same depth and/or position as the second set of data points that are created, 3D cloning tool 601 may delete or overwrite those data points with the values from the first set of data points.

Once 3D cloning tool 601 adds the second set of data points behind the data points representing the painting, point cloud 701 may be rotated to the side or behind the painting, and there will be no longer be a break in the textured brick wall. Instead, the second set of data points may fill in the gap behind the painting creating a continuous textured brick wall that obscures the back of the painting from a rear view.

In some embodiments, 3D cloning tool 601 may be adapted to function as a 3D healing brush tool. The 3D healing brush tool may be used to remove blemishes or unwanted artifacts from the 3D data file or point cloud while filling in the space behind the removed blemish or unwanted artifact with neighboring data points from planes that are further from the view frustum than the blemish or unwanted artifact.

Figure 8:
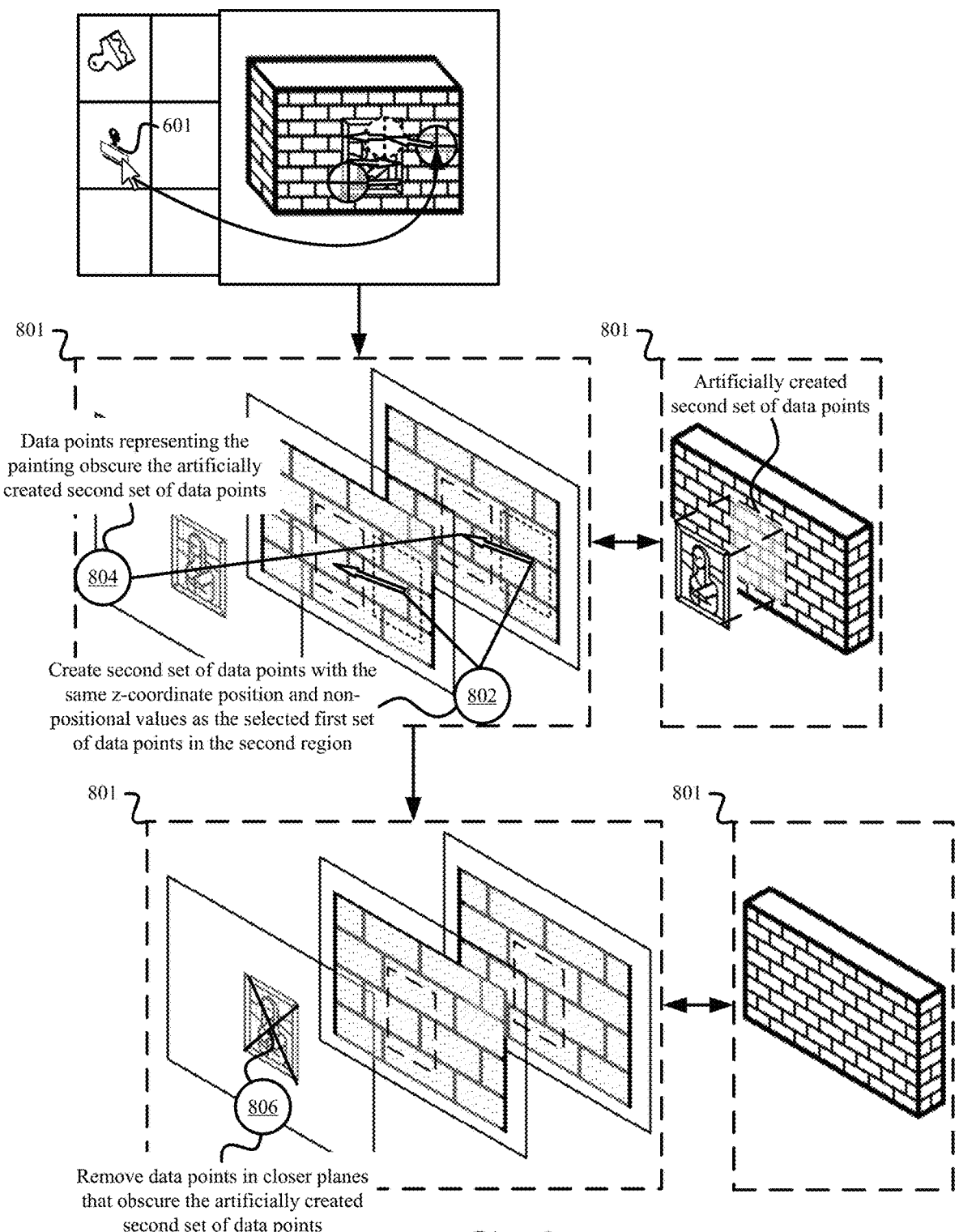
FIG. 8 illustrates an example of adapting the 3D cloning tool to operate as a 3D healing brush tool in accordance with some embodiments presented herein.

FIG. 8 illustrates an example of adapting 3D cloning tool 601 to operate as a 3D healing brush tool in accordance with some embodiments presented herein. As in FIG. 7, 3D cloning tool 601 may be used to create (at 802) the second set of data points with z-coordinate positional values behind those of the data points representing the painting by cloning a visible portion of the textured brick wall from the first region to the second empty region in the plane or z-coordinate position that is behind the data points representing the painting and that is aligned with the plane or z-coordinate position of the data points represented the textured brick wall. However, in FIG. 8, 3D cloning tool 601 may be configured to function as a 3D healing brush tool.

3D cloning tool 601 may analyze point cloud with the artificially created second set of points 801. In some embodiments, 3D cloning tool 601 may analyze the positional elements of the data points relative to view frustum.

3D cloning tool 601 may determine (at 804) that the data points representing the painting obscure the artificially created second set of data points because the data points representing the painting have the same or similar x and y coordinate positional values and closer z-coordinate positional values than the second set of data points. Accordingly, 3D cloning tool 601 may automatically remove (at 806) the data points representing the painting that obscure any of the second set of data points. In this manner, 3D cloning tool 601 becomes a 3D healing brush tool that may be used to remove unwanted artifacts from point cloud 801 or a 3D data file while providing a seamless transition to visual elements behind the unwanted artifacts.

In some embodiments, the 3D healing brush tool may use AI/ML to operate independent of 3D cloning tool 601. For instance, the 3D healing brush tool may be a separate selectable tool within the set of 3D editing tools. A user may activate the 3D healing brush tool, and may invoke the 3D healing brush tool directly over the data points representing the painting over the textured brick wall without having first selected the first region or first set of data points to clone. The 3D healing brush tool may delete and remove the data points representing the painting that are visible from the current view frustum or that are frontmost from the current view perspective. The 3D healing brush tool may determine that removal of the data points representing the painting creates a gap or break in the point cloud, and may use one or more AI/ML techniques to determine the next closest plane with a set of data points behind the removed data points of the painting (e.g., data points with a larger z-coordinate positional value than the removed data points) and that neighbor the painting across x and y coordinate positional values. The 3D healing brush tool may automatically select the neighboring set of data points in the further plane or with the larger z-coordinate positional value, and may extend the set of data points to fill the gap or break in the point cloud behind the painting. In other words, the 3D healing brush tool may automatically determine the set of data points in the background to use in extending the background behind another set of data points that are removed by the 3D healing brush tool.

Figure 9:
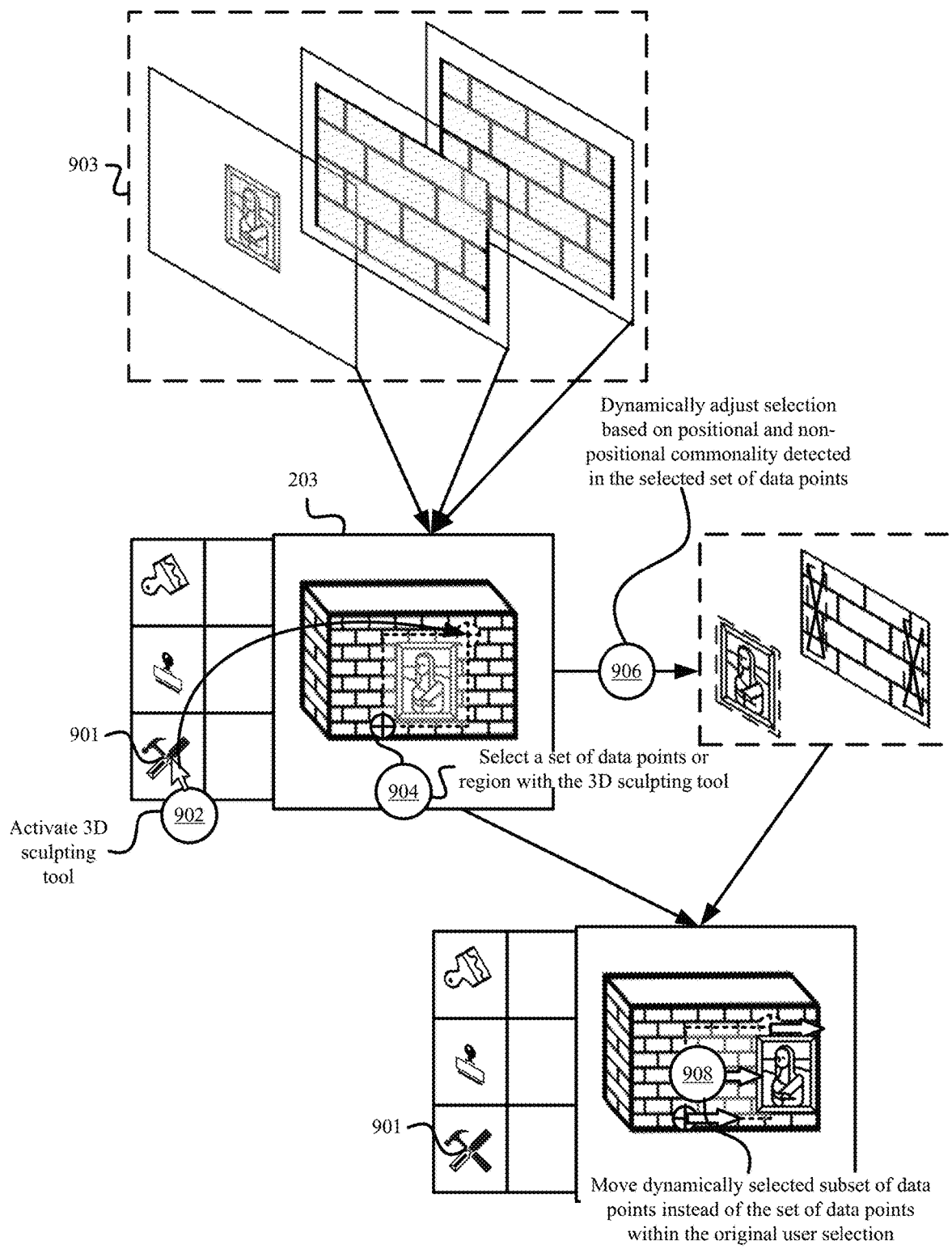
FIG. 9 illustrates an example of intelligently moving connected nodes using a 3D sculpting tool in accordance with some embodiments presented herein.

The set of 3D editing tools may include a 3D sculpting tool for intelligently moving or manipulating related or connected nodes in a region without moving or manipulating unrelated or disconnected nodes. FIG. 9 illustrates an example of intelligently moving connected nodes using the 3D sculpting tool in accordance with some embodiments presented herein.

3D sculpting tool 901 may be applied to point cloud 903 with data points representing a textured brick wall and a painting in front of a particular region of the textured brick wall. The user may select and/or activate (at 902) 3D sculpting tool 901.

The user may then move the cursor and select (at 904) a region within the rendered visualization of point cloud 903.

The selected region may include the data points that represent the painting and also some neighboring data points of the textured brick wall that are positioned at a different plane or z-coordinate positional value than the data points representing the painting.

3D sculpting tool 901 may use one or more AI/ML techniques to analyze the data points within the selected region, and to dynamically adjust (at 906) the selection to include a first subset of the set of data points for the painting and to exclude a second subset of the set of data points for the neighboring data points of the textured brick wall. Specifically, the AI/ML techniques may be used to detect positional and/or non-positional commonality that differentiates the first subset of data points from other data points in the selection (e.g., the second subset of data points), and to adjust (at 906) the selection of the set of data points based on detected positional and/or non-positional commonality.

In some embodiments, 3D sculpting tool 901 may dynamically adjust (at 906) the selection of the set of data points based on the z-coordinate positional values. 3D sculpting tool 901 may analyze the set of data points within the selected region in order to determine that a large percentage of the data points (e.g., the first subset of data points corresponding to the data points representing the painting) have z-coordinate positional values in a particular range, and that other data points (e.g., the second subset of data points corresponding to the neighboring data points of the textured brick wall) have z-coordinate positional values outside the particular range. Accordingly, 3D sculpting tool 901 may adjust (at 906) the selection based on the dynamically determined range of z-coordinate positional values for the most prominent object in the user selection.

In some embodiments, 3D sculpting tool 901 may also analyze the non-positional values of the data points within the originally selected region to further improve the dynamic selection of data points representing the painting. In some such embodiments, 3D sculpting tool 901 may determine z-coordinate positional commonality as well as color values, reflectivity, translucency, and/or other non-positional elements that differentiate the first subset of data points representing the painting from the second subset of data points representing the neighboring textured brick wall.

The user may use 3D sculpting tool 901 to move (at 908) the dynamically selected first subset of data points representing the painting. The dynamically unselected second subset of data points representing parts of the textured brick wall may remain unmoved even when the user input is applied to the originally selected region encompassing the set of data points.

Figure 10:
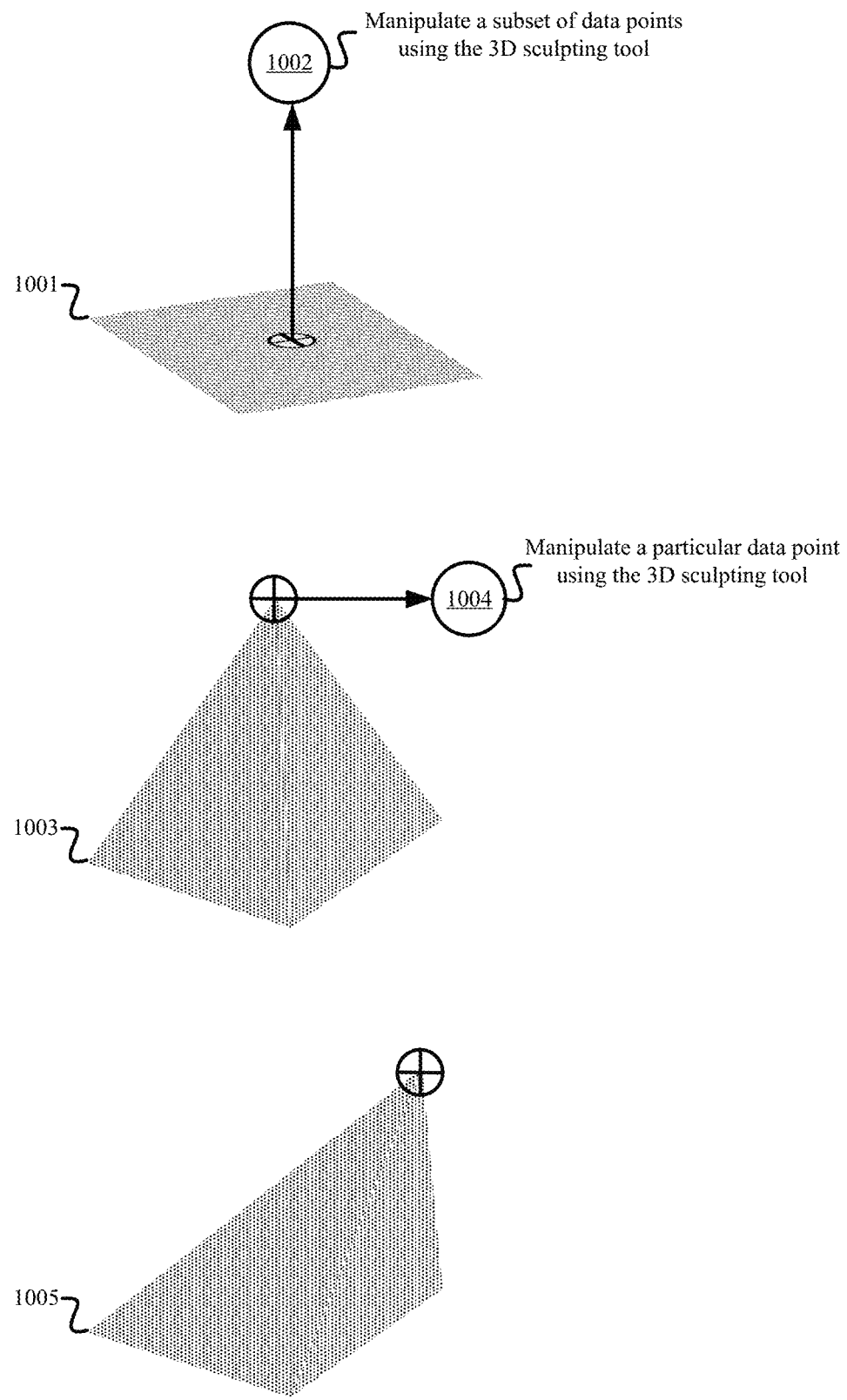
FIG. 10 illustrates an example of performing a connected or relative data point repositioning using the 3D sculpting tool in accordance with some embodiments presented herein.

In addition to moving the dynamically selected first subset of data points from one location in point cloud 903 to another, 3D sculpting tool 901 may also be used to perform a connected or relative repositioning of the dynamically selected first subset of data points. FIG. 10 illustrates an example of performing the connected or relative data point repositioning using 3D sculpting tool 901 in accordance with some embodiments presented herein.

After set of data points 1001 are dynamically selected using 3D sculpting tool 901 or another one of the set of 3D editing tools, 3D sculpting tool 901 may be used to grab and manipulate (at 1002) a subset of dynamically selected set of data points 1001. The manipulation (at 1002) may include pulling, pushing, rotating, and/or otherwise repositioning the subset of data points in 3D space.

In response to the manipulation of the subset of data points, 3D sculpting tool 901 may apply a gradually lesser manipulation to other data points within set of data points 1001 that are further away from the subset of data points. In some embodiments, 3D sculpting tool 901 may adjust the positioning of the neighboring data points based on their relative positions to the subset of data points that were directly targeted by the user input. Accordingly, the connected or relative data point repositioning may cause data points that neighbor the manipulated (at 1002) subset of data points to receive a lesser adjustment based on the distance of the neighboring data points from the subset of data points, the direction and magnitude of the applied adjustment, and based on their relative position to the subset of data points that were selected when the input was provided.

Adjusted set of data points 1003 illustrate the repositioning of data points resulting from the first manipulation (at 1002). 3D sculpting tool 901 may be used to manipulate (at 1004) a particular data point of adjusted set of data points 1003, and adjusted set of data points 1005 may present the adjustments made to other data points that are connected or linked to the particular data point.

In some embodiments, the adjustment that 3D sculpting tool 901 applies to the targeted data points and the surrounding data points may vary based on material properties and/or other non-positional values of the data points. For instance, the data points may include a non-positional element with values that define a varying elasticity, hardness, structure, and/or other material property of the data points. 3D sculpting tool 901 may account for these non-positional values when manipulating the data points. For instance, 3D sculpting tool 901 may deform or alter the positioning of data points that are defined with a greater elasticity value more in response to particular input than data points that are defined with a lesser elasticity value. Similarly, the manner with which the positioning of the data points are deformed by vary based on the defined material properties and/or non-positional values. For instance, 3D sculpting tool 901 may produce a pointed tower in response to user input that pulls a subset of data points with lesser elasticity values a particular distance, and may produce a concave rounded mound or cone in response to the same user input that pulls a subset of data points with greater elasticity values the same particular distance.

The set of 3D editing tools may include a 3D smoothing tool. The 3D smoothing tool may reduce noise in a 3D data file or point cloud.

Figure 11:
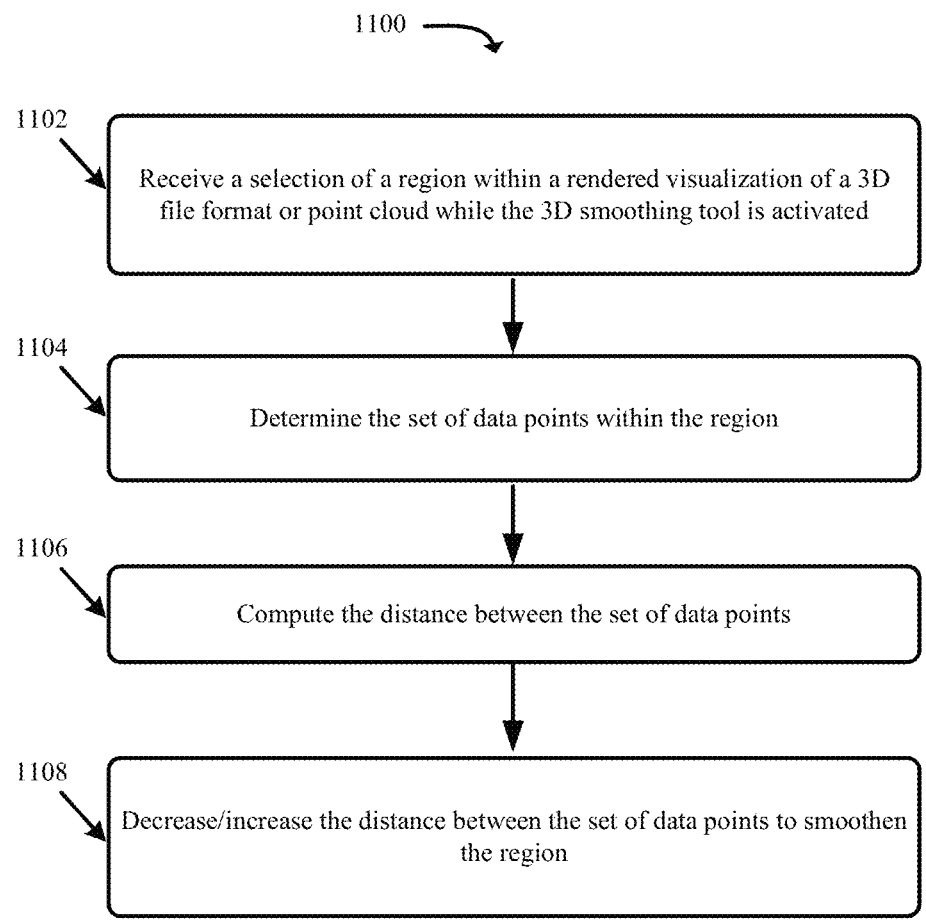
FIG. 11 presents a process for reducing and/or increasing noise in a point cloud in accordance with some embodiments presented herein.

FIG. 11 presents a process 1100 for reducing and/or increasing noise in a point cloud in accordance with some embodiments presented herein. Process 1100 may be implemented in response to activating and invoking the 3D smoothing tool in 3D editing application 203.

Process 1100 may include receiving (at 1102) a selection of a region within a rendered visualization of a 3D file format or point cloud while the 3D smoothing tool is activated and/or during an invocation of the 3D smoothing tool. The user may draw a shape or outline the region within the rendered visualization.

Process 1100 may include determining (at 1104) the set of data points within the region. Specifically, the 3D smoothing tool may select the set of data points that have positional values that are within the boundaries of the selected region.

Process 1100 may include computing (at 1106) the distance between the set of data points. In some embodiments, 3D smoothing tool may compute (at 1106) the average distance between neighboring pairs of data points or the exact distance between neighboring pairs of data points.

Process 1100 may include decreasing (at 1108) the distance between the set of data points to smoothen the region, and thereby decrease the noise in that region. Decreasing (at 1108) the distance may include adjusting the positional elements of the set of data points to reduce the average or total distance separating the set of data points.

In some embodiments, the 3D smoothing tool may uniformly decrease (at 1108) the x, y, and z separation between the set of data points. In some embodiments, the 3D smoothing tool may identify the outlying data points (e.g., the data points within the set of data points with the greatest distance separating them from other neighboring data points), and may decrease (at 1108) the distance separating the outlying data points more than the distance separating other data points in the set of data points.

In some embodiments, the 3D smoothing tool may perform an edge detection to avoid creating gaps or empty spaces in the point cloud when decreasing (at 1108) the distance between the set of data points. Specifically, the 3D smoothing tool may detect edges based on different color commonality or other non-positional commonality detected amongst subsets of the set of data points. For each subset of data points, the 3D sculpting tool may retain a position of the data points at the border or edges of the subset of data points, and may adjust the position of the other data points in the subset of data points for better alignment about a plane that connects the data points at the border or edges.

In some embodiments, the 3D smoothing tool may apply the opposite effect and increase the noise in the region. For instance, the user may change a setting of the 3D smoothing tool so that the 3D smoothing tool is modified to increase noise by a configurable amount. Increasing the noise in the region may include increasing the distance between the set of data points in the region. Specifically, the 3D smoothing tool may increase the distance by adjusting the positional elements of the set of data points to increase the average or total distance separating the set of data points. This may include uniformly or non-uniformly increasing the x, y, and z separation between the set of data points. Accordingly, a first subset of data points that are closer together than a second subset of data points in the region may be separated by a greater amount than the second subset of data points.

The set of 3D editing tools may include a 3D density tool. The 3D density tool may improve the resolution and detail in one poorly scanned or low resolution region of the point cloud with a corresponding region that was scanned with high resolution and detail.

Figure 12:
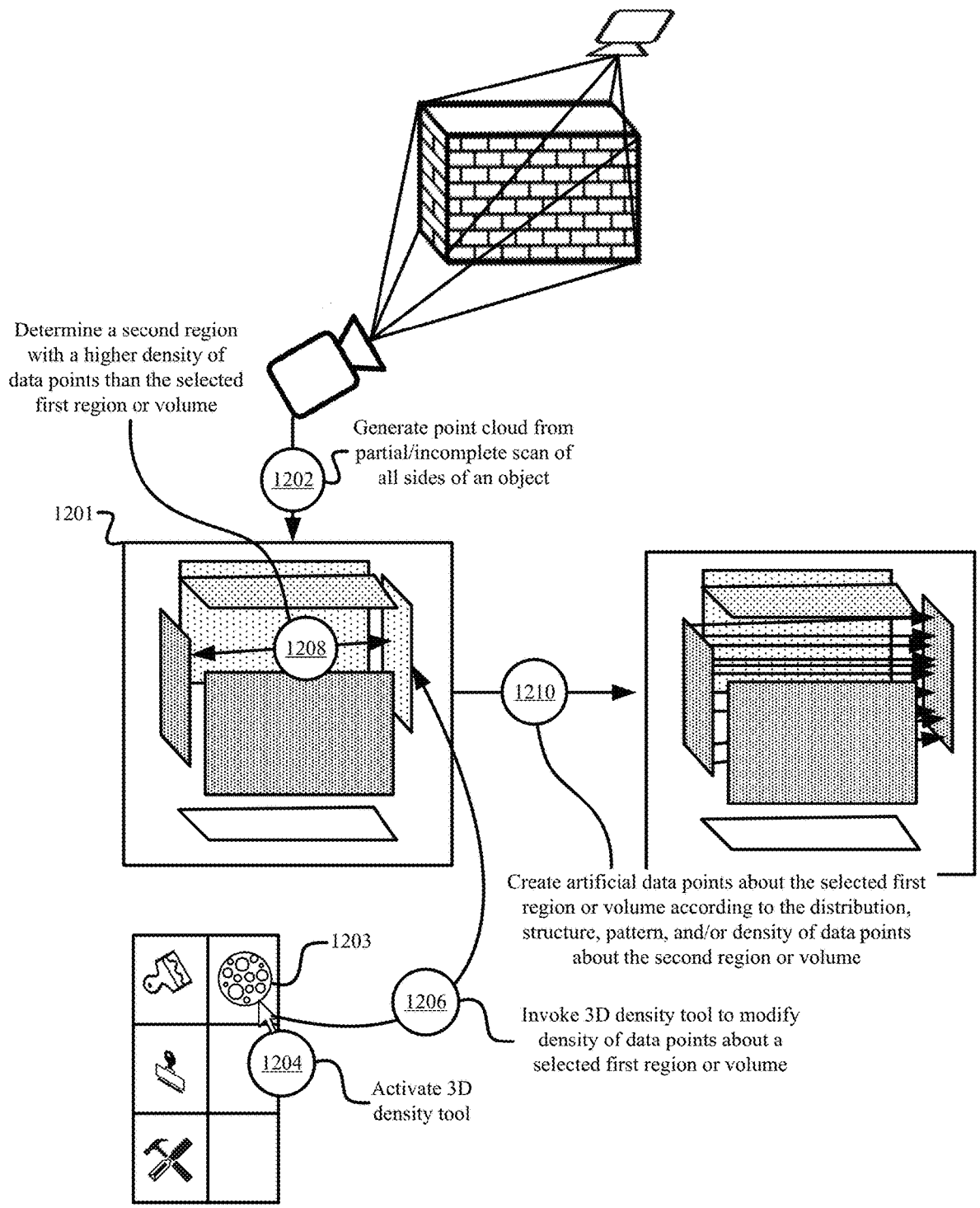
FIG. 12 illustrates example operation of a 3D density tool in accordance with some embodiments presented herein.

FIG. 12 illustrates example operation of the 3D density tool in accordance with some embodiments presented herein. As shown in FIG. 12, point cloud 1201 may be generated (at 1202) by scanning an object that has matching faces or surfaces from less than all sides. For instance, a first side may be exposed or closer to a scanning device that generates point cloud 1201, and may therefore be scanned with more data points at a greater density than an opposing second side that is not exposed or is only partially exposed to the second device. The second side may be rotated away or partially obscured from the scanning device, and may therefore be scanned with less data points at a lower density than the first side. Accordingly, resulting point cloud 1201 may provide a detailed and accurate capture of the first side and an undetailed and inaccurate capture of the second side.

A user may select and/or activate (at 1204) 3D density tool 1203, and may invoke (at 1206) 3D density tool 1203 about a selected region or volume of point cloud 1201 that was captured at a low resolution or with a low density of data points. The user may invoke (at 1206) 3D density tool 1203 to artificially increase the density of the data points about the selected region or volume according to the distribution and placement of data points about a complimentary or opposite region or volume of point cloud 1201 that is captured at a higher resolution or density.

3D density tool 1203 may use AI/ML to determine a structure or pattern with which the data points are arranged about the selected region or volume of point cloud 1201, and may scan point cloud 1201 for a similar structure or pattern elsewhere within point cloud 1201 at a higher resolution or density. In some embodiments, the AI/ML may determine that the x, y, and/or z-coordinate positional values for the data points of the selected region or volume correspond to one end of point cloud 1201, and the AI/ML may search for data points with a similar structure or pattern at an opposite end of point cloud 1201.

3D density tool 1203 may determine (at 1208) that the data points about selected region or volume have the same structure or pattern as the data points about a second region or volume of point cloud 1201, and may determine that the density of the data points about the second side is greater than the density of the data points about the selected region or volume. Accordingly, 3D density tool 1203 may create (at 1210) artificial data points about the selected region or volume according to the distribution, structure, pattern, and/or density of data points about the second region or volume of point cloud 1201. Specifically, 3D density tool 1203 may add data points about the second region or volume to match the density of data points found in the selected first region or volume of point cloud 1201.

For each data point that is added to the selected first region or volume, 3D density tool 1203 may identify the closest neighboring data points, may average the non-positional values of the neighboring data points, and may define the non-positional elements of the added data points using the computed average non-positional values of the neighboring data points. In this manner, 3D density tool 1203 may increase the detail and density about the selected first region or volume to match the detail and density about the second region or volume while retaining the coloring and/or other non-positional characteristics about the selected first region or volume. In some embodiments, a non-positional average value may be the arithmetic mean or a "smart average" that is computed from the corresponding non-positional value that is set for each of the neighboring data points. To compute a non-positional smart average value, 3D density tool 1203 may determine if there are any changes in the corresponding non-positional value of the neighboring data points, determining where the change occurs, and averaging out values with respect to the detected changes or where the detected changes occur.

In some embodiments, 3D density tool 1203 may match the density of data points in a first region to the density of data points in a second region by performing a reverse data point deletion operation when the density of data points in the second region is less than the density of data points in the first region. In this case, 3D density tool 1203 may match the resolution and detail in the two regions via a subtractive methodology. 3D density tool 1203 may determine a structure or pattern with which data points are arranged about a first region or volume of point cloud 1201. 3D density tool 1203 may then be invoked over a second region or volume of point cloud 1201 that has a higher density of data points. 3D density tool 1203 may selectively remove or delete data points in the second region or volume of point cloud 1201 that are extraneous for the structure or pattern determined within the first region or volume of point cloud 1201. 3D density tool 1203 may also adjust the positional elements of the remaining data points in the second region or volume to more closely match the positioning and distribution of data point in the first region or volume.

In some embodiments, 3D density tool 1203 may use AI/ML to identify a second region or volume of the point cloud that is opposite or parallel to a first region or volume of the point cloud that is selected using 3D density tool 1203. In some such embodiments, 3D density tool 1203 may update the density of data points in the first selected region or volume to match the density of data point in the second region or volume. Updating the density of data points in the first selected region may involve changing the pattern or structure of data points in the first selected region to match the structure or pattern of data points in the second region when the two data points in the two regions have different structures or patterns.

Figure 13:
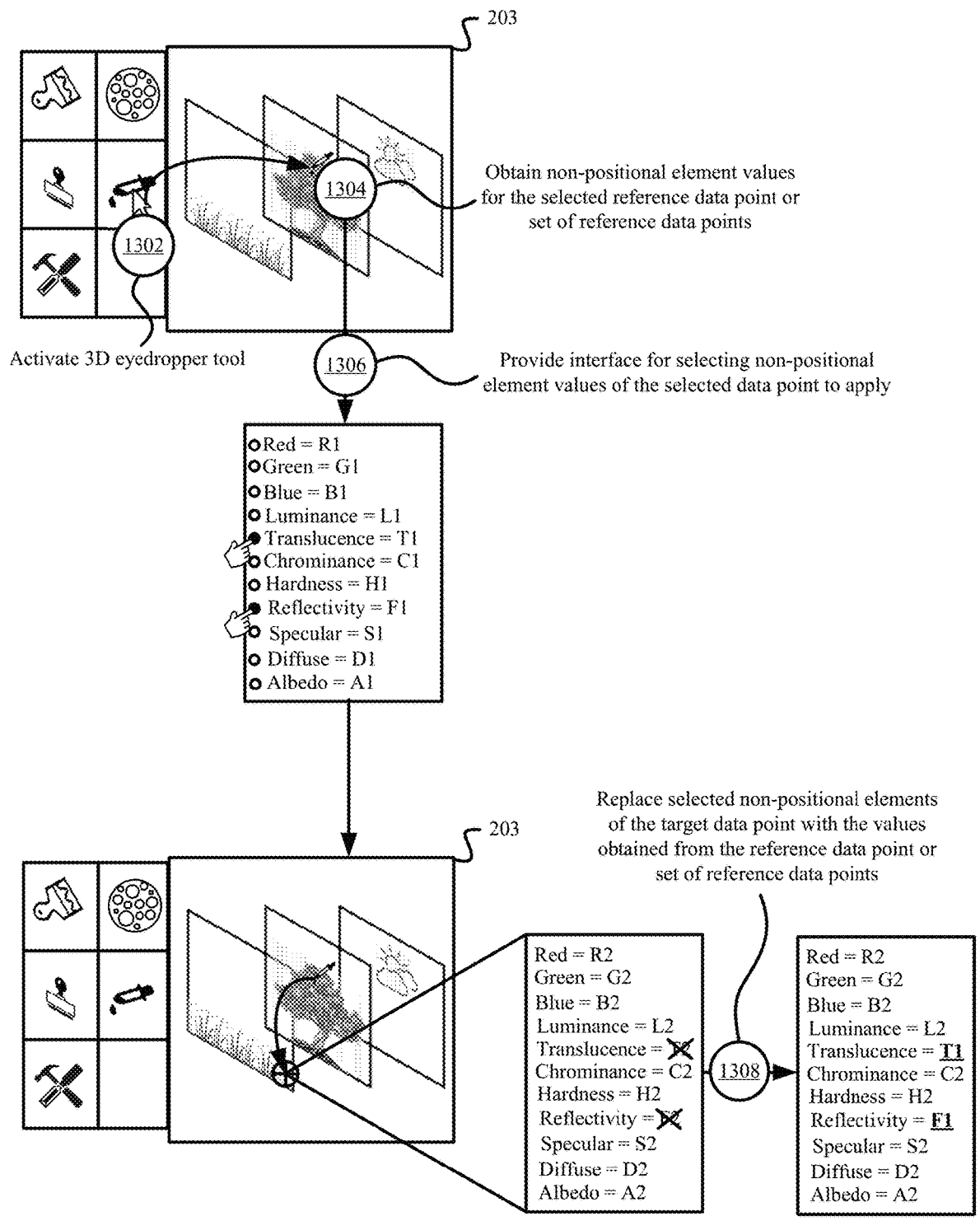
FIG. 13 illustrates example operation of a 3D eyedropper tool in accordance with some embodiments presented herein.

The set of 3D editing tools may include a 3D eyedropper tool that may be used to identify and replace selected attributes or non-positional elements of one data point with those of another data point. FIG. 13 illustrates example operation of the 3D eyedropper tool in accordance with some embodiments presented herein.

The user may select the GUI element for 3D eyedropper tool 1301 to activate (at 1302) the 3D eyedropper tool functionality. Once activated (at 1302), the cursor may be used to move within the point cloud, and to select a reference data point or a set of reference data points.

3D eyedropper tool 1301 may obtain (at 1304) the values that are set for each non-positional element of the reference data point, or may obtain the average or other derived values from the values that are set for each non-positional element of the set of reference data points. For instance, 3D eyedropper tool 1301 may obtain (at 1304) and/or extract the red, green, blue, chrominance, hardness, translucence, reflectivity, luminance, metallic characteristics, roughness, specular, diffuse, albedo, IOR, point or surface normal, and/or values of other non-positional elements of the particular data point.

3D eyedropper tool 1301 may provide (at 1306) a selectable interface with which a user may select which of the extracted non-positional element values to apply to another data point or set of data points. As shown in FIG. 13, the user may select the translucence and reflectivity non-positional elements, and may leave the other non-positional elements unselected.

3D eyedropper tool 1301 may then be used to replace the selected translucence and reflectivity non-positional elements of a target data point or a set of target data points with the values obtained from the reference data point or set of reference data points. For instance, the 3D eyedropper tool 1301 may be used to select (at 1308) a target data point with a first set of values for the translucence and reflectivity non-positional elements, and 3D eyedropper tool 1301 may replace the first set of values with the set of values obtained from the reference data point. In this manner, 3D eyedropper tool 1301 may be used to adjust specific attributes of a target data point or set of target data points to match corresponding attributes of data points elsewhere in the point cloud without adjusting other attributes of the target data point or set of target data points.

In some embodiments, 3D eyedropper tool 1301 may adjust the values of the selected non-positional elements that are obtained from a reference data point prior to applying the values to corresponding non-positional elements of a target data point based on a difference in the positional values between the reference data point and the target data point. For instance, the reference data point may be defined with a first z-coordinate positional value and a first translucence value, and the target data point may be defined with a second z-coordinate positional value and a second translucence value. The second z-coordinate positional value may be greater than the first z-coordinate positional value such that the target data point is at a farther depth than the reference data point (e.g., the target data point is farther from the render position than the reference data point). Rather than replace the second translucence value of the target data point with the first translucence value of the reference data point, 3D eyedropper tool 1301 may determine that the translucence varies based on the distance or depth from the render position. Accordingly, 3D eyedropper tool 1301 may adjust the first translucence value according to the difference between the first z-coordinate positional value and the second z-coordinate positional value, and may replace the translucence non-positional element of the target data point with the adjusted first translucence value that is different than the first translucence value of the reference data point.

In some embodiments, 3D eyedropper tool 1301 may automatically select the target data points based on their existing non-positional values. For instance, 3D eyedropper tool 1301 may be used to select the translucence and reflectivity non-positional elements of a reference data point. However, rather than manually select the target data points that are to receive the translucence and reflectivity non-positional elements of the reference data point, 3D eyedropper tool 1301 may provide an input interface into which a user may specify non-positional values of affected target data points. For instance, the user may specify replacing the translucence and reflectivity non-positional elements of any data points that have a specific range of RGB values or a specific metallic property. 3D eyedropper tool 1301 may then scan the point cloud to identify one or more target data points with the specific range of RGB values or the specific metallic property, any may replace the translucence and reflectivity non-positional elements of the target data points with the translucence and reflectivity values of the reference data point. In some embodiments, 3D eyedropper tool 1301 may restrict the selection of the target data points to a user-selected or user-specific region. For instance, the user may select a volume within the point cloud, and 3D eyedropper tool 1301 may search for target data points that have the specific range of RGB values or the specific metallic property only within the selected volume.

In some embodiments, a selection brush tool may be used in conjunction with 3D eyedropper tool 1301 to replace non-positional values of select target data points in a region where the selection brush tool is applied with the corresponding non-positional values of one or more reference data points selected with 3D eyedropper tool 1301. For instance, 3D eyedropper tool 1301 may be used to select non-positional values of a reference data point with a particular position or distance from the view frustum or that has a particular z-coordinate position. The selection brush tool may be used to rotate or move within the point cloud and/or change the view frustum, and may be invoked over a set of data points. Rather than replace the non-positional values of the entire set of data points, the selection brush tool may perform a selective replacement based on the position or distance of the data points from the view frustum or based on their z-coordinate position. In some embodiments, the selection brush tool may dynamically select a subset of the set of data points that are the same or a threshold position or distance from the current view frustum as the particular position or distance of the reference data point from the view frustum when 3D eyedropper tool 1301 was used to select the non-positional values of the reference data point, and may replace the non-positional values of the subset of data points with the non-positional values of the reference data point. In some embodiments, the selection brush tool may dynamically select a subset of the set of data points that have the same z-coordinate position as the reference data point, and may replace the non-positional values of the subset of data points with the non-positional values of the reference data point.

The set of 3D editing tools may include a volumetric correction tool for adjusting the saturation, contrast, gamma, gain, offset, shadows, midtones, highlights, RGB channels, and/or other non-positional elements of a selected set of data points based on their relative positioning. In some embodiments, the volumetric correction tool may apply the same adjustment to all data points within a volumetric selection. In some other embodiments, the volumetric correction tool may not apply a non-uniform adjustment the data points within the volumetric selection. For instance, the volumetric correction tool may vary the specified adjustment based on the relative depth (e.g., z-coordinate positional value) of the selected set of data points and/or based on the relative distance between the set of data points. In so doing, the volumetric correction tool may produce more realistic effects that simulate how the human eye perceives color at different distances.

Figure 14:
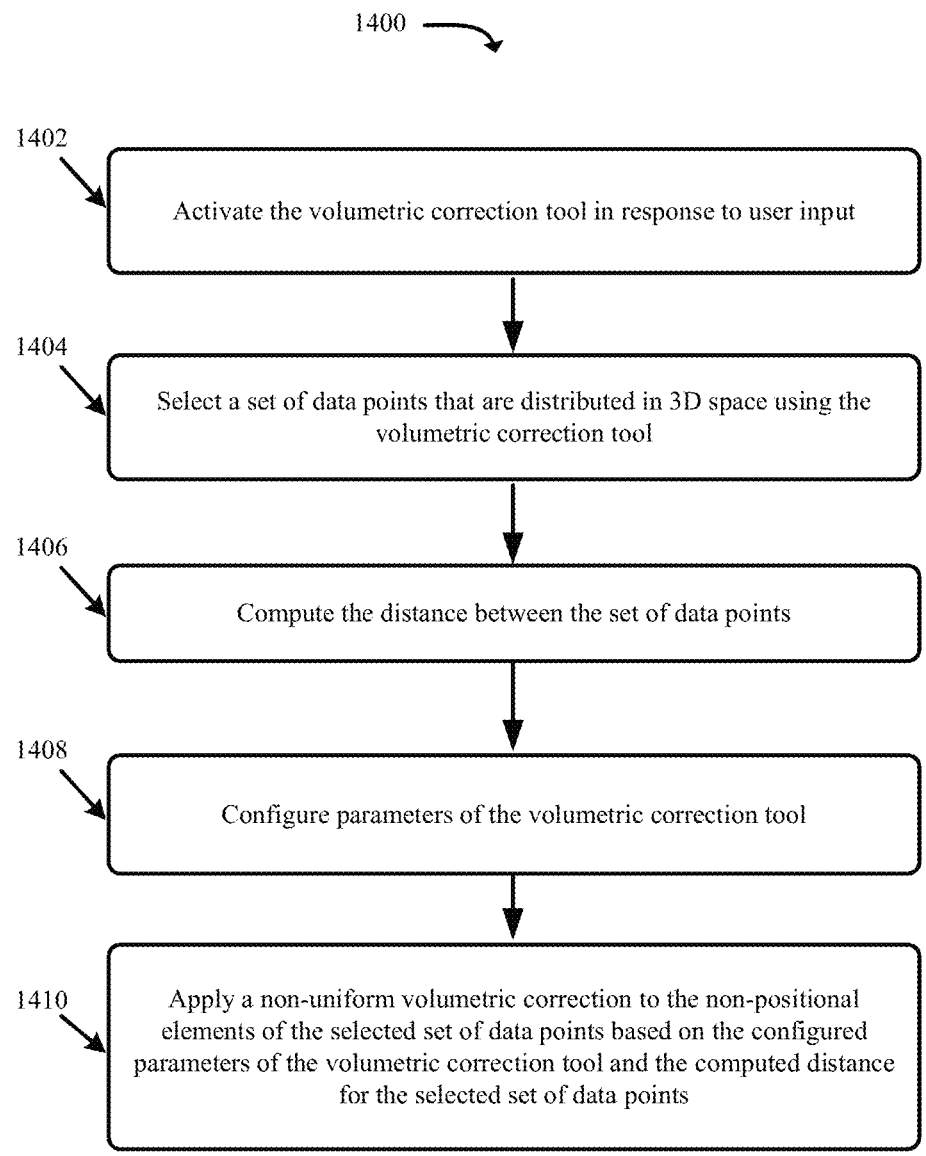
FIG. 14 presents a process for implementing a volumetric correction to non-positional elements of a set of data points in accordance with some embodiments presented herein.

FIG. 14 presents a process 1400 for implementing a volumetric correction to non-positional elements of a set of data points in accordance with some embodiments presented herein. Process 1400 may be implemented using the volumetric correction tool from 3D editing application 203.

Process 1400 may include activating (at 1402) the volumetric correction tool in response to user input. The user input may include selecting a graphical element representing the volumetric correction tool in 3D editing application 203.

Process 1400 may include selecting (at 1404) a set of data points that are distributed in 3D space using the volumetric correction tool. In some embodiments, the volumetric correction tool may provide 3D shapes (e.g., cylinders, cones, cubes, etc.) with which to select the set of data points across different x, y, and z positional values. In some embodiments, the volumetric correction tool may provide a freeform selection tool or brush tool with which the user may select the set of data points. In some embodiments, the volumetric correction tool may provide an input interface into which the user may specify start and end x, y, and z positional values for the data points to be included in the selection.

Process 1400 may include computing (at 1406) the distance between the set of data points. In some embodiments, computing (at 1406) the distance may include determining the minimum and maximum z-coordinate values specified for the selected data points, or the relative z-coordinate positioning of the data points. In some embodiments, computing (at 1406) the distance may include computing the relative distance of each data point from the render position or the position of a virtual camera based on the x, y, and z coordinate positional values of each data point in the selected set of data points.

Process 1400 may include configuring (at 1408) parameters of the volumetric correction tool. Configuring (at 1408) the parameters may include specifying the desired change to one or more of the saturation, contrast, gamma, gain, offset, shadows, midtones, highlights, RGB channels, and/or other non-positional elements for the selected set of data points. Additionally, configuring (at 1408) the parameters may include defining the application of the volumetric correction to the set of data points. For instance, a greater volumetric correction may be applied to data points that are closest to the render position and a lesser volumetric correction may be applied to data points that are furthest from the render position or vice versa. In some embodiments, the volumetric correction parameters may be configured (at 1408) via a set of sliders, toggle switches, and/or other input fields.

Figure 15:
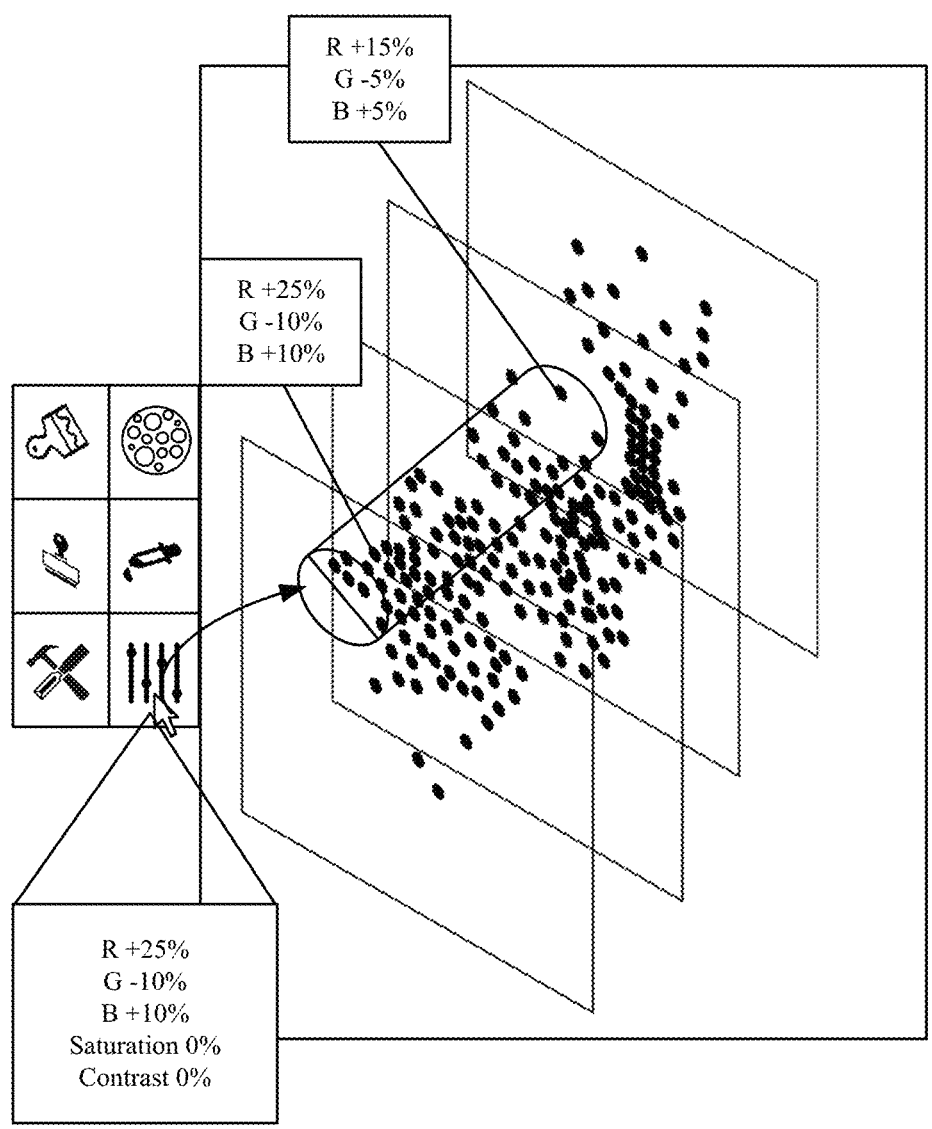
FIG. 15 illustrates an example of applying a non-uniform volumetric correction to a set of data points defined with different z-coordinate positional values.

Process 1400 may include applying (at 1410) a non-uniform volumetric correction to the non-positional elements of the selected set of data points based on the configured parameters of the volumetric correction tool and the computed distance for the selected set of data points. FIG. 15 illustrates an example of applying a non-uniform volumetric correction to a set of data points defined with different z-coordinate positional values. As shown in FIG. 15, the RGB channels of a first data point with the smallest z-coordinate positional value receive a greater adjustment than the RGB channels of the second data point with a larger z-coordinate positional value.

In some embodiments, process 1400 may include applying (at 1410) a uniform volumetric correction to the non-positional elements of the selected set of data points. In some such embodiments, the non-positional elements of the selected set of data points may receive the same adjustment.

Figure 16:
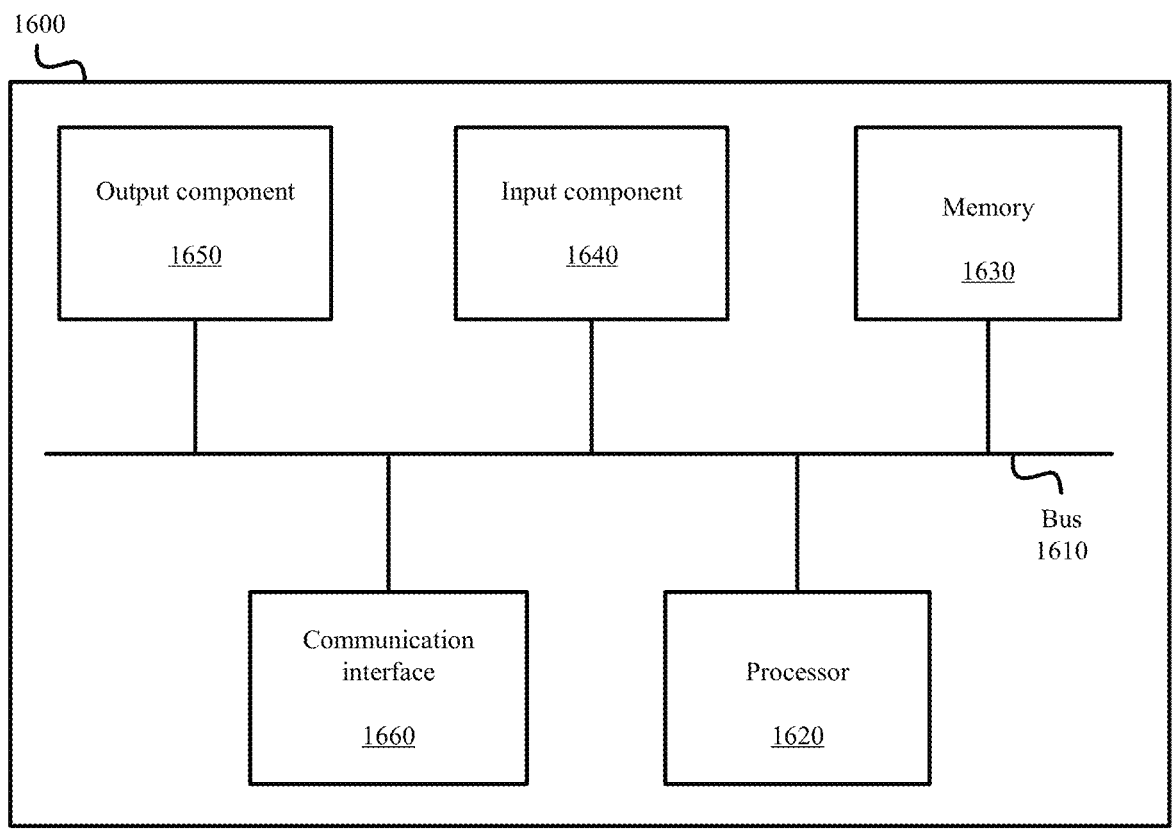
FIG. 16 illustrates example components of one or more devices, according to one or more embodiments described herein.

FIG. 16 is a diagram of example components of device 1600. Device 1600 may be used to implement one or more of the tools, devices, or systems described above (e.g., 3D editing application 203, 3D brush tool 205, 3D cloning tool 601, 3D sculpting tool 901, 3D healing brush tool, 3D smoothing tool, 3D density tool 1203, 3D eyedropper tool 1301, volumetric correction tool, etc.). Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600, such as a keyboard, a keypad, a button, a switch, etc. Output component 1650 may include a mechanism that outputs information to the operator, such as a display, a speaker, one or more LEDs, etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    generating a visualization of three-dimensional ("3D") data, wherein a form of the visualization is generated from x-coordinate values, y-coordinate values, and z-coordinate values of the 3D data, and wherein coloring of the visualization is generated from non-positional elements of the 3D data;
    detecting activation of a selectable editing tool over a particular region of the visualization, wherein the selectable editing tool comprises settings for adjusting one or more of the non-positional elements;
    performing a dynamic selection from a set of the 3D data with x-coordinate values and y-coordinate values within the particular region in response to detecting the activation of the selectable editing tool over the particular region, wherein performing the dynamic selection comprises selecting a subset of 3D data from the set of the 3D data with x-coordinate values and y-coordinate values within the particular region and z-coordinate values within a particular range of depths; and
    adjusting the non-positional elements of the subset of 3D data in response to detecting the activation of the selectable editing tool over the particular region, wherein adjusting the non-positional elements comprises:
        changing the coloring at a part of the visualization that is generated from the non-positional elements of the subset of 3D data; and
        maintaining the coloring at a part of the visualization that is generated from the non-positional elements of other 3D data from the set of the 3D data within the particular region with z-coordinate values outside the particular range of depths.

2. The method of claim 1 further comprising:
evaluating the z-coordinate values of the set of the 3D data with the x-coordinate values and the y-coordinate values within the particular region;
determining a most common z-coordinate value within the z-coordinate values of the set of the 3D data; and
defining the particular range of depths based on the most common z-coordinate value.

3. The method of claim 1 further comprising:
dynamically configuring the particular range of depths based on a z-coordinate value of a particular point within the visualization that is selected using the selectable editing tool prior to detecting the activation of the selectable editing tool over the particular region.

4. The method of claim 1,
wherein the particular region comprises a plurality of rendered objects, and
wherein the subset of 3D data comprises a first set of the plurality of objects that are rendered at the particular range of depths.

5. The method of claim 1 further comprising:
presenting a tool selection interface comprising a first selectable editing tool and a second selectable editing tool; and
wherein adjusting the non-positional elements further comprises:
adjusting the coloring of the visualization that is generated from the non-positional elements of the subset of 3D data in response to detecting the activation of the first selectable editing tool; and
replacing the part of the visualization that is generated from the non-positional elements of the subset of 3D data in the particular region with a part of the visualization that is generated by a different subset of 3D data that is outside the particular region and that has z-coordinate values in the particular range of depths in response to detecting the activation of the second selectable editing tool.

6. The method of claim 1,
wherein the visualization of the 3D data comprises a plurality of pixels producing a two-dimensional presentation of the 3D data, and
wherein adjusting the non-positional elements of the subset of 3D data comprises changing a representation for a first set of the plurality of pixels that are generated from the non-positional elements of the subset of 3D data without changing a representation for a second set of the plurality of pixels that are generated from the non-positional elements of the other 3D data in the particular region with z-coordinate values outside the particular range of depths.

7. The method of claim 1 further comprising:
removing the part of the visualization that is generated from the non-positional elements of the other 3D data with x-coordinate values and y-coordinate values within the particular region and z-coordinate values outside the particular range of depths.

8. The method of claim 1 further comprising:
adjusting one or more of the x-coordinate values, the y-coordinate values, or the z-coordinate values of the subset of 3D data in response to detecting the activation of the selectable editing tool over the particular region.

9. A system for editing three-dimensional ("3D") data, the system comprising:
an interface comprising:
a visualization of the 3D data, wherein a form of the visualization is generated from x-coordinate values, y-coordinate values, and z-coordinate values of the 3D data, and wherein coloring of the visualization is generated from non-positional elements of the 3D data; and
a selectable editing tool that is activated over a particular region of the visualization, wherein the selectable editing tool comprises settings for adjusting one or more of the non-positional elements; and
one or more hardware processors configured to:
dynamically select from a set of the 3D data with x-coordinate values and y-coordinate values within the particular region in response to the selectable editing tool being activated over the particular region, wherein dynamically selecting comprises selecting a subset of 3D data from the set of the 3D data with x-coordinate values and y-coordinate values within the particular region and z-coordinate values within a particular range of depths; and
adjust the non-positional elements of the subset of 3D data in response to the selectable editing tool being activated over the particular region, wherein adjusting the non-positional elements comprises:
changing the coloring at a part of the visualization that is generated from the non-positional elements of the subset of 3D data; and
maintaining the coloring at a part of the visualization that is generated from the non-positional elements of other 3D data from the set of the 3D data within the particular region with z-coordinate values outside the particular range of depths.

10. The system of claim 9, wherein the one or more hardware processors are further configured to:
evaluate the z-coordinate values of the set of the 3D data with the x-coordinate values and the y-coordinate values within the particular region;
determine a most common z-coordinate value within the z-coordinate values of the set of the 3D data; and
define the particular range of depths based on the most common z-coordinate value.

11. The system of claim 9, wherein the one or more hardware processors are further configured to:
dynamically configure the particular range of depths based on a z-coordinate value of a particular point within the visualization that is selected using the selectable editing tool prior to detecting the activation of the selectable editing tool over the particular region.

12. The system of claim 9,
wherein the particular region comprises a plurality of rendered objects, and
wherein the subset of 3D data comprises a first set of the plurality of objects that are rendered at the particular range of depths.

13. The system of claim 9, wherein the one or more hardware processors are further configured to:
present a tool selection interface comprising a first selectable editing tool and a second selectable editing tool; and
wherein adjusting the non-positional elements further comprises:
adjusting the coloring of the visualization that is generated from the non-positional elements of the subset of 3D data in response to detecting the activation of the first selectable editing tool; and
replacing the part of the visualization that is generated from the non-positional elements of the subset of 3D data in the particular region with a part of the visualization that is generated by a different subset of 3D data that is outside the particular region and that has z-coordinate values in the particular range of depths in response to detecting the activation of the second selectable editing tool.

14. The system of claim 9,
wherein the visualization of the 3D data comprises a plurality of pixels producing a two-dimensional presentation of the 3D data, and
wherein adjusting the non-positional elements of the subset of 3D data comprises changing a representation for a first set of the plurality of pixels that are generated from the non-positional elements of the subset of 3D data without changing a representation for a second set of the plurality of pixels that are generated from the non-positional elements of the other 3D data in the particular region with z-coordinate values outside the particular range of depths.

15. The system of claim 9, wherein the one or more hardware processors are further configured to:
remove the part of the visualization that is generated from the non-postional elements of the other 3D data with x-coordinate values and y-coordinate values within the particular region and z-coordinate values outside the particular range of depths.

16. The system of claim 9, wherein the one or more hardware processors are further configured to:
adjust one or more of the x-coordinate values, the y-coordinate values, or the z-coordinate values of the subset of 3D data in response to detecting the activation of the selectable editing tool over the particular region.

17. A method comprising:
generating a visualization of three-dimensional ("3D") data, wherein a form of the visualization is generated from x-coordinate values, y-coordinate values, and z-coordinate values of the 3D data, and wherein coloring of the visualization is generated from non-positional elements of the 3D data;
detecting activation of a selectable editing tool over a particular region of the visualization, wherein the selectable editing tool comprises settings for adjusting one or more of the non-positional elements, and wherein the particular region comprises a plurality of rendered objects;
performing a dynamic selection from a set of the 3D data with x-coordinate values and y-coordinate values within the particular region in response to detecting the activation of the selectable editing tool over the particular region, wherein performing the dynamic selection comprises selecting a subset of 3D data from the set of the 3D data with x-coordinate values and y-coordinate values within the particular region and z-coordinate values within a particular range of depths, and wherein the subset of 3D data comprises a first set of the plurality of objects that are rendered at the particular range of depths; and
adjusting the non-positional elements of the subset of 3D data in response to detecting the activation of the selectable editing tool over the particular region.

18. A system for editing three-dimensional ("3D") data, the system comprising:
an interface comprising:
a visualization of the 3D data, wherein a form of the visualization is generated from x-coordinate values, y-coordinate values, and z-coordinate values of the 3D data, and wherein coloring of the visualization is generated from non-positional elements of the 3D data; and a selectable editing tool that is activated over a particular region of the visualization, wherein the selectable editing tool comprises settings for adjusting one or more of the non-positional elements, and wherein the particular region comprises a plurality of rendered objects; and
one or more hardware processors configured to:
dynamically select from a set of the 3D data with x-coordinate values and y-coordinate values within the particular region in response to the selectable editing tool being activated over the particular region, wherein dynamically selecting comprises selecting a subset of 3D data from the set of the 3D data with x-coordinate values and y-coordinate values within the particular region and z-coordinate values within a particular range of depths, and wherein the subset of 3D data comprises a first set of the plurality of objects that are rendered at the particular range of depths; and
adjust the non-positional elements of the subset of 3D data in response to the selectable editing tool being activated over the particular region.

19. A method comprising:
generating a visualization of three-dimensional ("3D") data, wherein a form of the visualization is generated from x-coordinate values, y-coordinate values, and z-coordinate values of the 3D data, wherein coloring of the visualization is generated from non-positional elements of the 3D data, and wherein the visualization comprises a plurality of pixels producing a two-dimensional presentation of the 3D data;
detecting activation of a selectable editing tool over a particular region of the visualization, wherein the selectable editing tool comprises settings for adjusting one or more of the non-positional elements;
performing a dynamic selection from a set of the 3D data with x-coordinate values and y-coordinate values within the particular region in response to detecting the activation of the selectable editing tool over the particular region, wherein performing the dynamic selection comprises selecting a subset of 3D data from the set of the 3D data with x-coordinate values and y-coordinate values within the particular region and z-coordinate values within a particular range of depths; and
adjusting the non-positional elements of the subset of 3D data in response to detecting the activation of the selectable editing tool over the particular region, wherein adjusting the non-positional elements comprises changing a representation for a first set of the plurality of pixels that are generated from the non-positional elements of the subset of 3D data without changing a representation for a second set of the plurality of pixels that are generated from other 3D data in the particular region with z-coordinate values outside the particular range of depths.

20. A system for editing three-dimensional ("3D") data, the system comprising:
an interface comprising:
a visualization of the 3D data, wherein a form of the visualization is generated from x-coordinate values, y-coordinate values, and z-coordinate values of the 3D data, wherein coloring of the visualization is generated from non-positional elements of the 3D data, and wherein the visualization comprises a plurality of pixels producing a two-dimensional presentation of the 3D data; and a selectable editing tool that is activated over a particular region of the visualization, wherein the selectable editing tool comprises settings for adjusting one or more of the non-positional elements; and one or more hardware processors configured to:

dynamically select from a set of the 3D data with x-coordinate values and y-coordinate values within the particular region in response to the selectable editing tool being activated over the particular region, wherein dynamically selecting comprises selecting a subset of 3D data from the set of the 3D data with x-coordinate values and y-coordinate values within the particular region and z-coordinate values within a particular range of depths; and adjust the non-positional elements of the subset of 3D data in response to the selectable editing tool being activated over the particular region, wherein adjusting the non-positional elements comprises changing a representation for a first set of the plurality of pixels that are generated from the non-positional elements of the subset of 3D data without changing a representation for a second set of the plurality of pixels that are generated from other 3D data in the particular region with z-coordinate values outside the particular range of depths.

* * * * *